US012305809B2

(12) United States Patent
Kampf et al.

(10) Patent No.: US 12,305,809 B2
(45) Date of Patent: May 20, 2025

(54) COMPOSITE TANK

(71) Applicant: AMTROL LICENSING INC., West Warwick, RI (US)

(72) Inventors: Christopher Kampf, Moosup, CT (US); Jeffrey Neto, Cumberland, RI (US); Ken Cerpovicz, Warwick, RI (US); Jody McKinley, Mt. Vernon, OH (US); Alex Spires, Westerville, OH (US); Nicholas Bolcon, Coventry, RI (US)

(73) Assignee: ARMTROL LICENSING INC., West Warwick, RI (US)

( * ) Notice: Subject to any disclaimer, the term of this patent is extended or adjusted under 35 U.S.C. 154(b) by 53 days.

(21) Appl. No.: 18/147,841

(22) Filed: Dec. 29, 2022

(65) Prior Publication Data

US 2024/0003492 A1 Jan. 4, 2024

Related U.S. Application Data

(60) Provisional application No. 63/312,492, filed on Feb. 22, 2022, provisional application No. 63/295,159, filed on Dec. 30, 2021.

(51) Int. Cl.
*F17C 1/16* (2006.01)

(52) U.S. Cl.
CPC ........ *F17C 1/16* (2013.01); *F17C 2201/0109* (2013.01); *F17C 2203/0617* (2013.01); *F17C 2203/066* (2013.01); *F17C 2205/0305* (2013.01)

(58) Field of Classification Search
CPC ................ F17C 1/16; F17C 2201/0109; F17C 2203/0617; F17C 2203/066; F17C 2205/0305; F17C 2205/018; F17C 2270/0745; F17C 1/08; F17C 2208/0107; F17C 2203/012; F17C 2201/0114;
(Continued)

(56) References Cited

U.S. PATENT DOCUMENTS 2,827,195 A 3/1958 Kearns
3,137,317 A * 6/1964 Peters ...................... F16J 13/00
138/30
4,006,838 A 2/1977 Baumann
(Continued)

FOREIGN PATENT DOCUMENTS

CA 2518095 9/2004
CA 2584183 4/2006
(Continued)

OTHER PUBLICATIONS

English Machine Translation of FR-2870919-A1 (Year: 2005).*
(Continued)

*Primary Examiner* — Don M Anderson
*Assistant Examiner* — Laura E. Parker
(74) *Attorney, Agent, or Firm* — TUCKER ELLIS LLP

(57) ABSTRACT

Provided is a tank including a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, wherein the upper dome, lower dome, and shell form a cavity.

14 Claims, 37 Drawing Sheets

(58) Field of Classification Search
CPC ....... F17C 2203/0673; E03B 2011/005; F24D 3/1008; F24D 3/1016
USPC .......................................................... 220/581
See application file for complete search history.

(56) References Cited

U.S. PATENT DOCUMENTS

| | | | | |
|---|---|---|---|---|
| D244,578 | S | 6/1977 | Avant | |
| 4,214,611 | A | 7/1980 | Takacs et al. | |
| D276,889 | S | 12/1984 | Biesecker | |
| D284,033 | S | 5/1986 | Brodsky | |
| D287,335 | S | 12/1986 | Anderson | |
| 4,637,435 | A | 1/1987 | Chirdon | |
| D295,886 | S | 5/1988 | Dolton | |
| D306,639 | S | 3/1990 | Wills | |
| D335,744 | S | 5/1993 | Small | |
| 5,780,130 | A | 7/1998 | Hansen | |
| 5,829,614 | A | 11/1998 | Collette | |
| 6,103,280 | A | 8/2000 | Molzahn | |
| D537,977 | S | 3/2007 | Chen | |
| D621,471 | S | 8/2010 | Bock | |
| D667,130 | S | 9/2012 | Baker | |
| D700,948 | S | 3/2014 | Mcgiveron | |
| D746,942 | S | 1/2016 | Koppert | |
| 9,528,659 | B2 | 12/2016 | Manser et al. | |
| 9,751,689 | B2 | 9/2017 | Dinovo et al. | |
| D912,199 | S | 3/2021 | Aguiar et al. | |
| D923,136 | S | 6/2021 | Kaplan | |
| 11,274,793 | B2 * | 3/2022 | Kampf | F17C 1/08 |
| 2004/0173624 | A1 | 9/2004 | Carter | |
| 2006/0000839 | A1 | 1/2006 | Gremour et al. | |
| 2006/0131314 | A1 * | 6/2006 | Lombari | B29C 66/53262 220/721 |
| 2009/0071965 | A1 * | 3/2009 | Lida | B29C 70/86 220/721 |
| 2009/0266816 | A1 | 10/2009 | Holroyd | |
| 2010/0025411 | A1 * | 2/2010 | Otsubo | F17C 1/14 220/581 |
| 2010/0276434 | A1 * | 11/2010 | Berger | F17C 1/16 427/372.2 |
| 2011/0056472 | A1 * | 3/2011 | Stone | F17C 13/04 220/581 |
| 2013/0082074 | A1 | 4/2013 | Armstrong | |
| 2014/0319153 | A1 * | 10/2014 | Porterfield | F17C 1/00 220/581 |
| 2018/0080607 | A1 | 3/2018 | Van Haaren et al. | |
| 2018/0162081 | A1 | 6/2018 | Gmbh | |
| 2021/0156516 | A1 | 5/2021 | Kampf et al. | |

FOREIGN PATENT DOCUMENTS

| | | | | |
|---|---|---|---|---|
| CN | 303618441 | | 3/2016 | |
| CN | 303900716 | | 10/2016 | |
| FR | 2870919 | A1 * | 12/2005 | F17C 1/14 |
| WO | 2015183873 | A1 | 12/2015 | |
| WO | 2021108306 | A1 | 6/2021 | |

OTHER PUBLICATIONS

Coleman Fuel Cylinder found on Jul. 22, 21 at: https://www.amazon.com/Propane-Fuel-Cylinders-pk-oz/dp/3016YLUXLE/ (Year: 2017).

PCT/US2020/061790; Notification of Transmittal of the Intl. Search Report and the Written Opinion of the Intl. Searching Authority; 14 pgs. mailed Mar. 15, 2021.

PCT/US2022/082531; Notification of Transmittal of the International Search Report and the Written Opinion of the International Searching Authority; 14 pages; mailed May 2, 2023.

* cited by examiner

COMPOSITE TANK

RELATED APPLICATIONS

This application is a Non-provisional Application of U.S. Provisional Application Ser. No. 63/312,492, filed Feb. 22, 2022 entitled "COMPOSITE TANK" and U.S. Provisional Application Ser. No. 63/295,159, filed Dec. 30, 2021 entitled "COMPOSITE TANK." The entities of the aforementioned applications are incorporated herein by reference.

TECHNICAL FIELD

In general, the present invention relates to a tank, and in particular to a composite fluid tank.

BACKGROUND OF THE INVENTION

Many well and expansion tanks use a diaphragm or bladder to separate air from water. An air charge pressure on one side keeps the diaphragm/bladder at a distance away from the inside wall of the tank in the air dome. When the tank is installed onto a water system, the water system pressure pushes back against the diaphragm/bladder, compressing the air. The proper pre-charge will continue to keep the diaphragm/bladder away from the tank wall. If the pre-charge pressure is not enough to provide an air volume appropriate for the water supply pressure, the diaphragm/bladder will fill the air cell. If eventually the diaphragm/bladder "bottoms out" on the tank wall, the tank becomes ineffective in the function it has been design to provide. One type of such tank is a Type IV fiberwound tank. The industry defines this tank as having a plastic liner with fiberwinding around the liner.

SUMMARY OF THE INVENTION

In accordance with an embodiment of the present application, a tank is provided that includes a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, the connections being the same as one another, wherein the upper dome, lower dome, and shell form a cavity.

In accordance with another embodiment of the present application, a tank assembly is provided that includes a tank including a polymeric body defining a cavity and having an upper neck and a lower neck each defining a through passage in communication with the cavity, and a lower connector having an inlet portion attached to the lower neck and a conduit portion extending from the inlet portion, the inlet portion and conduit portion each having a through passage fluidly connected with one another to direct flow from the cavity through the conduit portion, and a support stand supporting the tank, the support stand including a support body having an upper wall and a locking aperture defined in the upper wall through which the lower connector extends, a sidewall extending downward from the upper wall and having an aperture through which the conduit extends, a lower wall extending downward from a lower end of the sidewall, and an attachment mechanism extending from the locking aperture for connection to the tank.

In accordance with still another embodiment of the present application, a tank is provided that includes a polymeric upper dome, a polymeric lower dome, a polymeric shell having a first end connected to the upper dome and a second end connected to the lower dome and forming with the upper and lower dome a cavity, a flexible diaphragm connected to an inner wall of the polymeric shell in the cavity, and a fiberwinding layer around an outer surface of the polymeric upper dome, polymeric lower dome, and polymeric shell.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
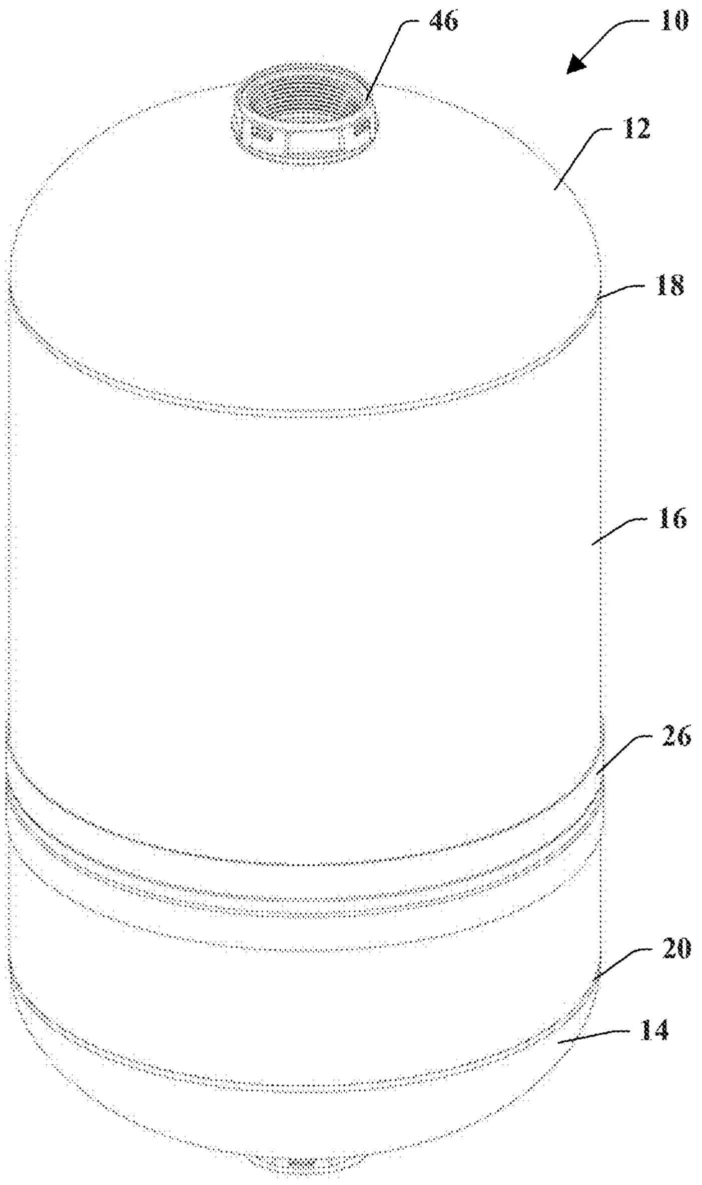
FIG. 1 is a perspective view of an exemplary tank.
Figure 2:
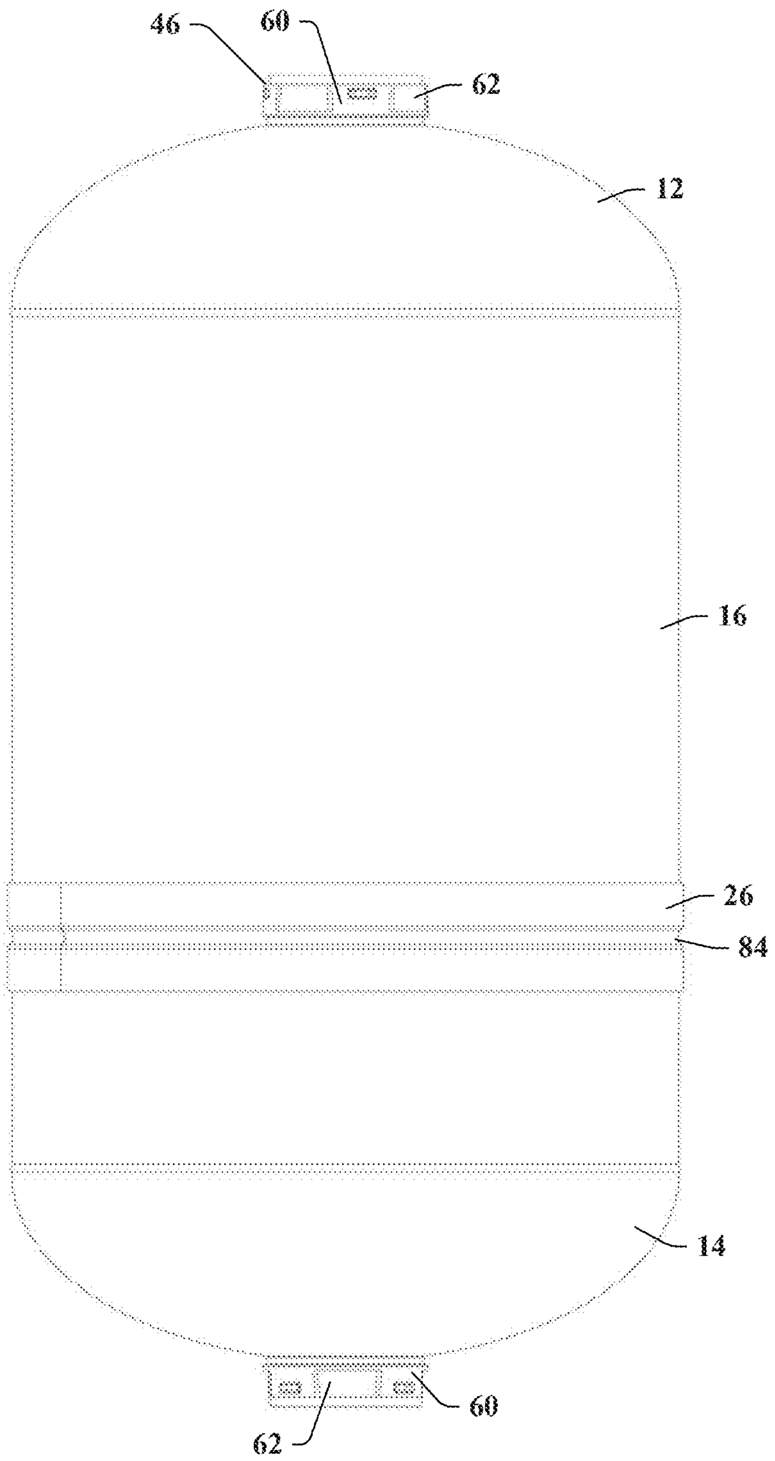
FIG. 2 is a front view of the tank.
Figure 3:
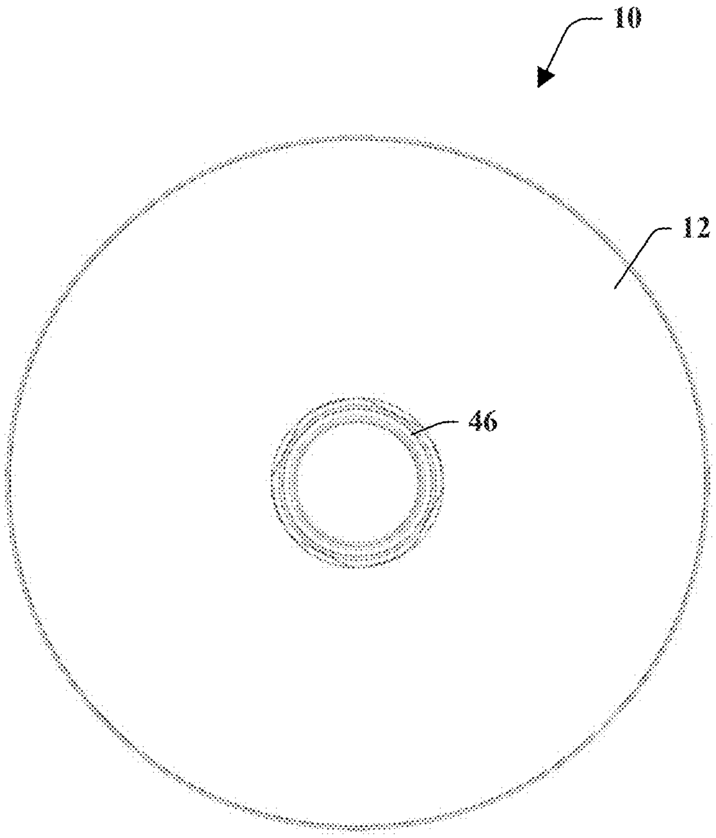
FIG. 3 is a top view of the tank.
Figure 4:
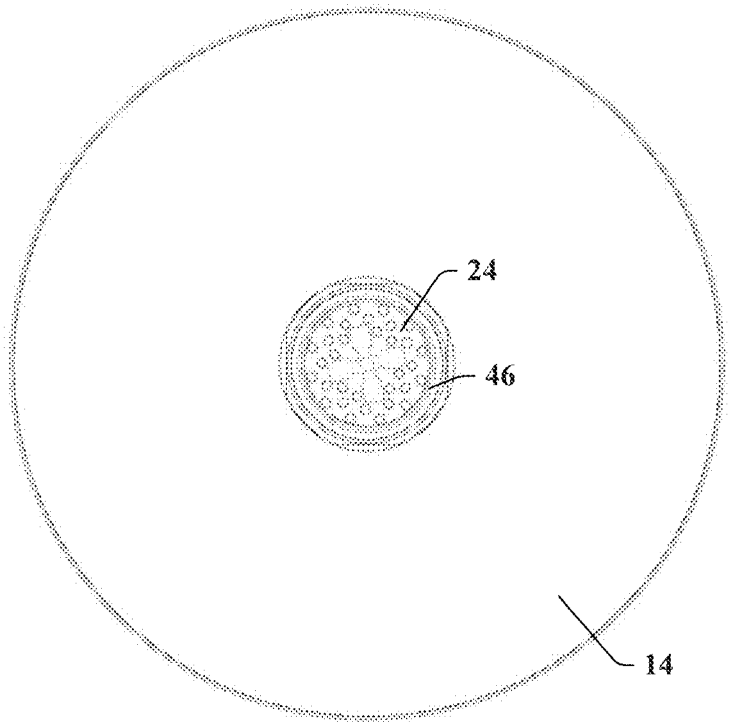
FIG. 4 is a bottom view of the tank.
Figure 5:
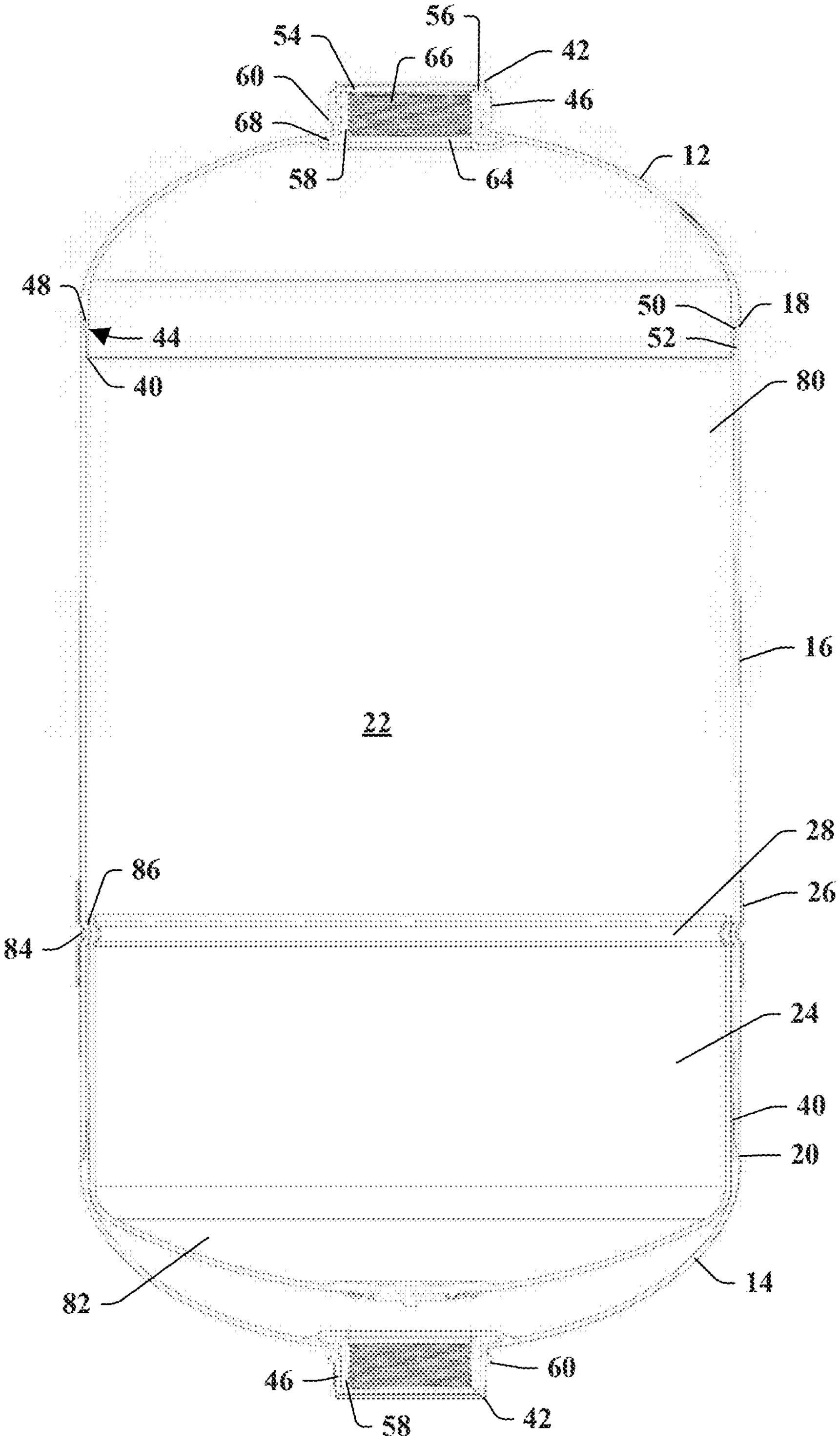
FIG. 5 is a cross-sectional view taken about line 5-5 in FIG. 2.
Figure 6:
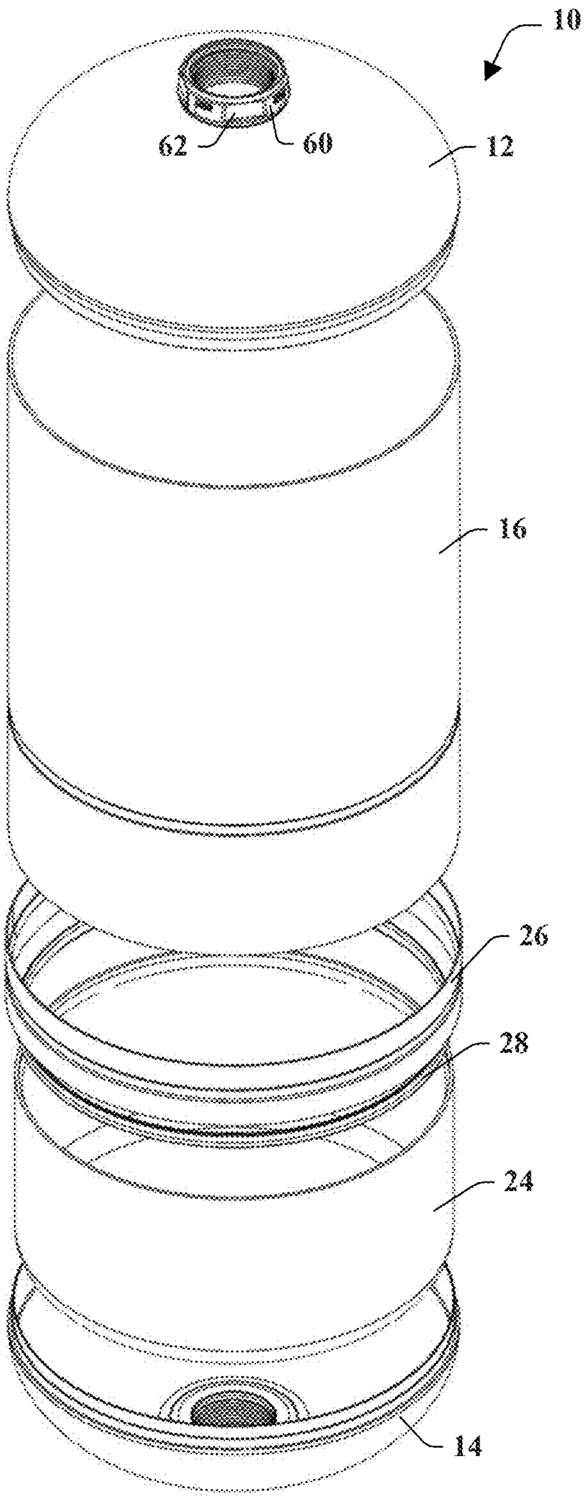
FIG. 6 is an exploded view of the tank.

Embodiments of the invention relate to methods and systems that relate to a tank including a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, the connections being the same as one another, wherein the upper dome, lower dome, and shell form a cavity.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-6, an exemplary fluid tank is illustrated generally at reference numeral 10. The fluid tank 10 may be a composite tank, such as a Type IV fiberwound tank for use as a well or expansion tank. The fluid tank 10 includes an upper dome 12, a lower dome 14, and a shell 16 having a first end 18 connected to the upper dome 12 and a second end 20 connected to the lower dome. The tank 10 can include a fiberwinding layer, that can, for example, be made of a suitable composite, such as an epoxy glass fiber resin matrix. The upper dome 12, lower dome 14, and shell 16 form a cavity 22 for receiving a diaphragm 24 that is held in position by an outer band 26 and an inner hoop ring 28 as will be described below. The upper and lower domes 12 and

14 and the shell 16 may be made of a suitable material, such as polypropylene, and may be a suitable color, such as black or dark blue to prevent bacteria growth. In an embodiment, the upper and lower domes 12 and 14 may be injection-molded domes made of a polymer, such as a polyolefin, such as a polypropylene copolymer and the shell 16 may be extruded and made of a polymer, such as a polyolefin, such as a polypropylene copolymer. The upper and lower domes may be the same as one another for ease of manufacture.

Figure 7:
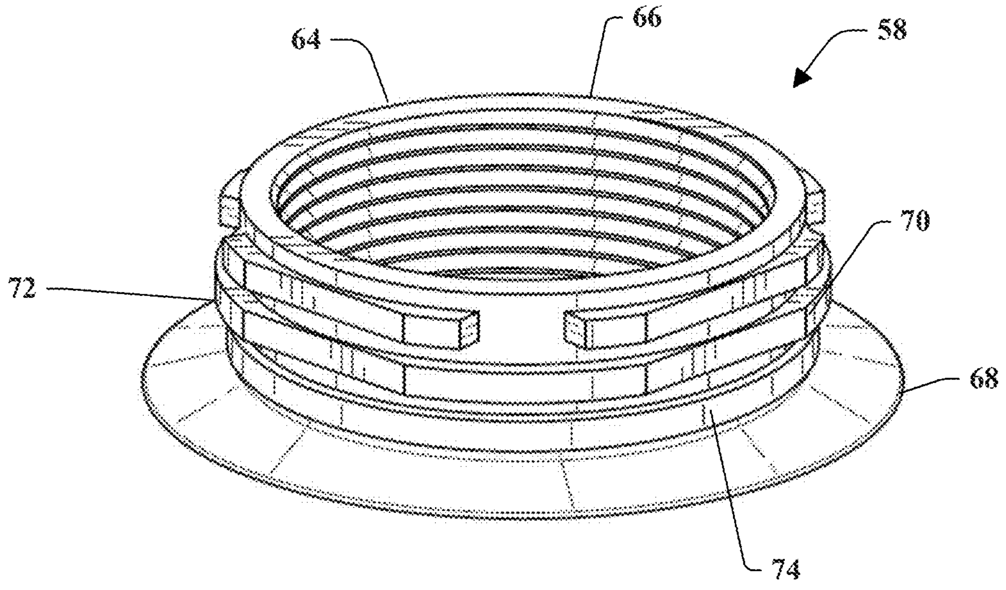
FIG. 7 is a perspective view of a connection of the tank.
Figure 8:
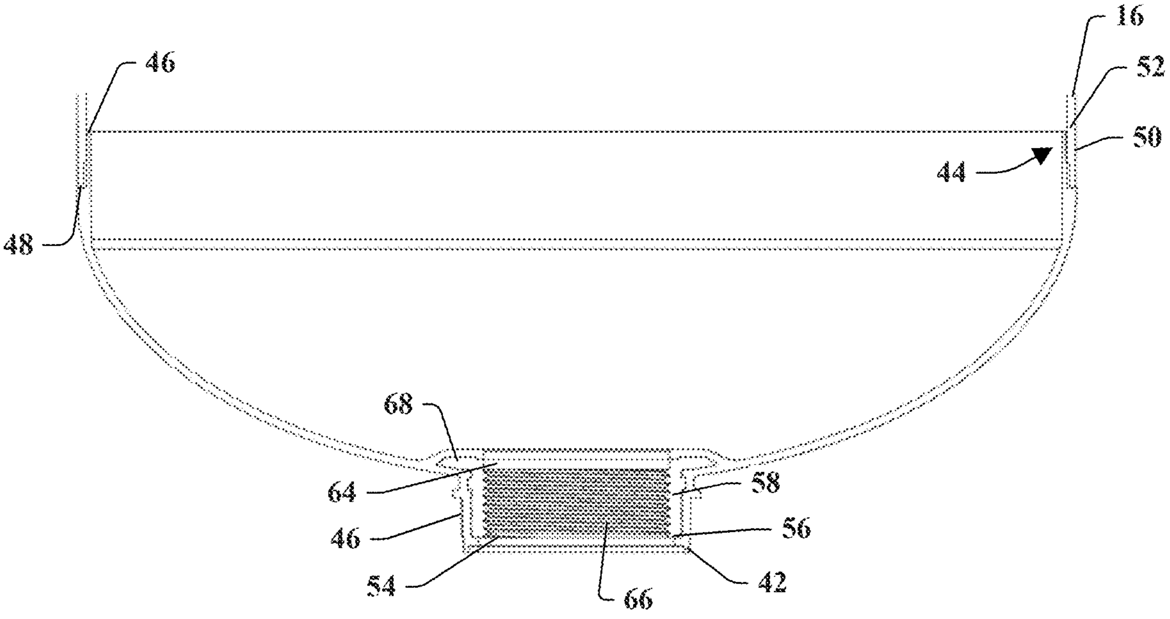
FIG. 8 is an enlarged cross-sectional view of a portion of the tank.

Referring additionally to FIGS. 7 and 8, each dome 12 and 14 has a first end 40 and a second end 42, a lead-in 44 proximate the first end 40 for connection to the respective first or second end 18 or 20 of the shell 16, and a neck 46 at the second end 42. The lead-ins 44 each include an annular base 48 against which an end face of the first or second ends 18 or 20 abut and first and second diameter portions 50 and 52 that are progressively smaller than an outer diameter of the domes 12 and 14 to form a gap between the shell 16 and the domes 12 and 14. Once the domes 12 and 14 and shell 16 are positioned relative to one another, they are connected, for example by spin welding, to form a hermetical seal between one another. The lead-ins 44 allow for ease of assembly and provide a tank where the outer surfaces of the domes 12 and 14 and the shell 16 are substantially flush with one another.

The neck 46 of each dome 12, 14 defines a through passage 54 into the cavity 22 and includes a radially inwardly extending annular rib 56 serving as a seat for a seal to ensure a seal is made between the neck 46 and a respective connection 58 to prevent leakage, for example from water and/or air. The neck also includes a radially outwardly extending annular rib 60 along its outer surface configured to capture composite material in a manner that will support the connection attached to the neck 46 and keep the connection in position when under high burst pressures. The radially outwardly extending annular ribs 60 each include a plurality of circumferentially spaced flats 62.

The connections 58 are received in the through passage 54 of the respective dome 12, 14 and attached to the respective dome 12, 14 in a suitable manner, such as by insert molding. The connections 58 may be made of a suitable material, such as a polymer, such as a polypropylene copolymer, such as a glass-filled polypropylene. The connections 58 each have a through passage 64 with threads 66 along an inner surface thereof and a flange portion 68 received in a corresponding area in the domes 12 and 14. The threads 66 may be a suitable thread, such as a two and one half inch NPSM thread utilized in the water treatment industry. As shown in FIG. 7, the connections 58 additionally can include one or more annular ribs 70 on the outer surface that promote adhesion with the domes 12 and 14. As shown, the connections 58 include a plurality of annular rips spaced from one another along a length of the connection 58 that each include flats 72, such as molded-in flats that provide an anti-rotation feature. The connections 58 additionally include an annular rib 74 extending around the connection 58 proximate the flange portion 68. The connections 58 on the upper and lower domes 12 and 14 can be the same to allow the tank 10 to receive various attachments interchangeably to be used in various industries.

Referring again to FIG. 6, the attachment of the diaphragm 24 will be described in detail. The diaphragm 24 may be a flexible diaphragm made of a suitable material, such as butyl rubber, that is positioned within the cavity 22 and connected to an inner diameter surface of the shell 16 to separate the cavity 22 into an upper portion 80 and a lower portion 82. The upper portion 80 is sealed to contain a pressurized gas, for example, and the lower portion 82 is sealed to contain a pressurized fluid, for example. The diaphragm 24 is connected to the shell 16 prior to at least one of the upper and lower domes 12 and 14, and may be positioned and pushed inside the shell 16 to a programmed location by a mandrel. The inner hoop ring 28 is operatively connected to an inner surface of the diaphragm 24 to hold the diaphragm 24 in place against the shell 16. The outer band 26 can be inserted over the shell 16 and grooved such that a hoop groove 84 of the band 26 mates with a hoop groove 86 of the shell 16, and the hoop groove 86 mates with the inner hoop ring 28 to pinch the diaphragm 24 between the hoop groove 86 of the shell 16 and the inner hoop ring 28. It is contemplated that the band 26 and inner hoop ring 28 are made from a metallic material, such as steel. Although described as including the diaphragm 24, it will be appreciated that the tank may be provided without a diaphragm for use in industries such as the water treatment industry.

Figure 10:
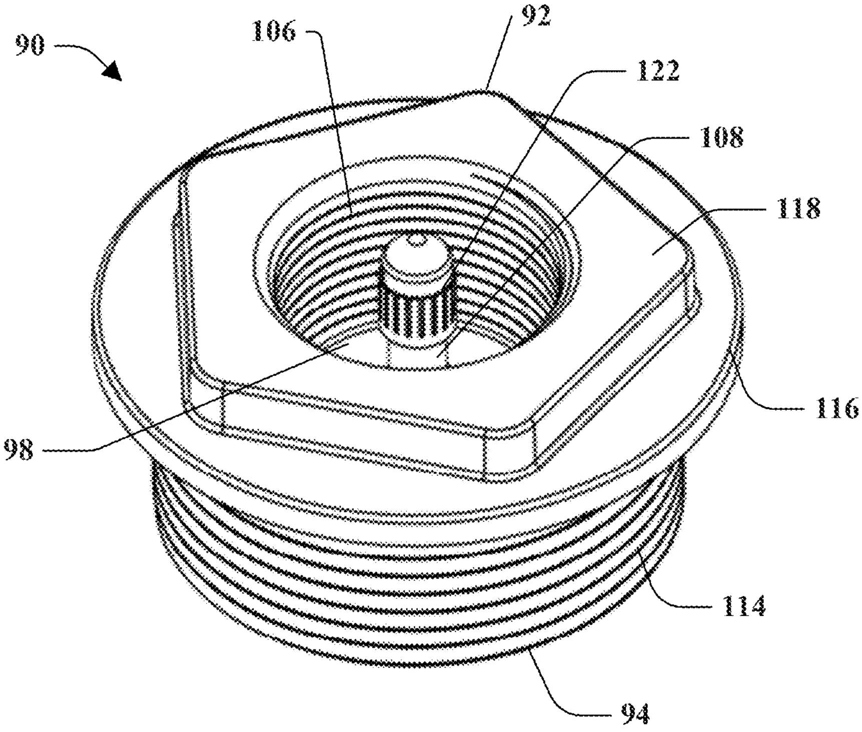
FIG. 10 is a perspective view of an air connector configured to attach to the tank.
Figure 11:
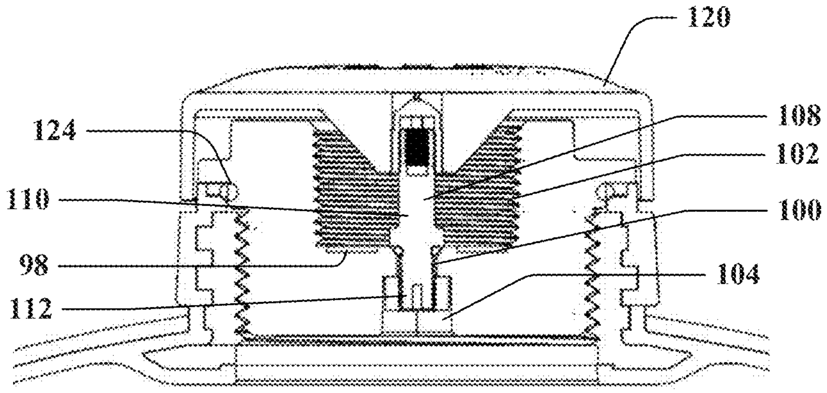
FIG. 11 is a partial cross-sectional view of a top of the tank.
Figure 12:
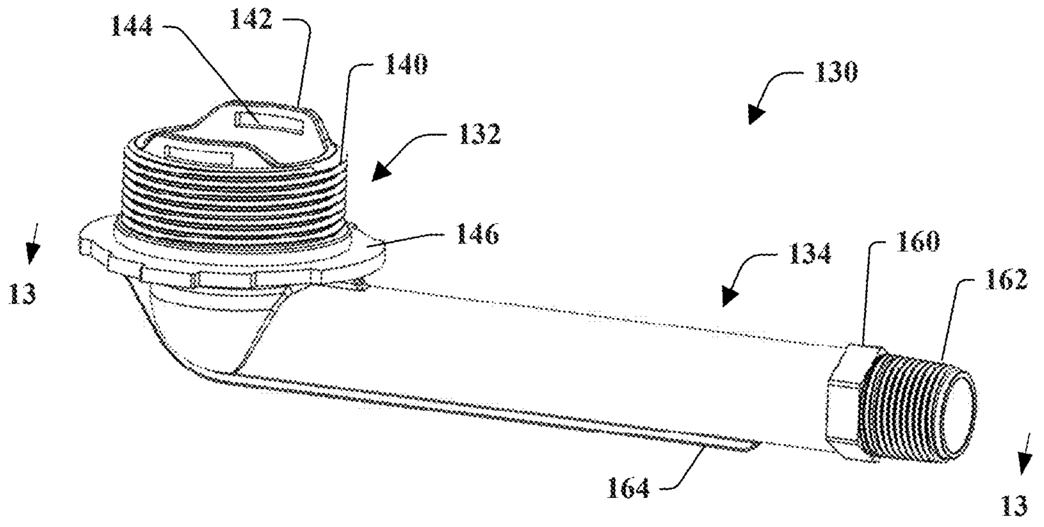
FIG. 12 is a perspective view of a connection configured to attach to the tank.
Figure 13:
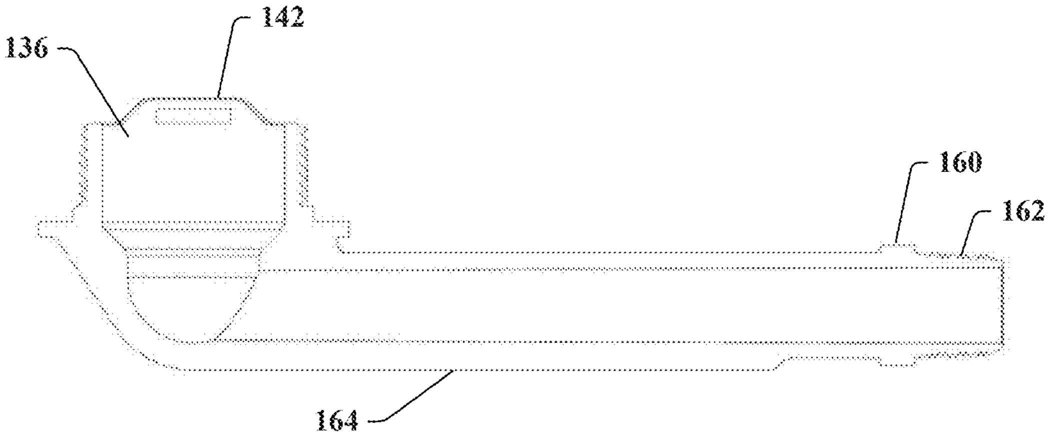
FIG. 13 is a cross-sectional view taken about line 13-13 in FIG. 12.

Turning now to FIGS. 10 and 11, an exemplary air connector 90 configured to be coupled to the connection 58 of the upper dome 12 is shown. The air connector 90 may be made of a suitable material, such as a polymer, for example a polypropylene copolymer, such as a glass-filled polypropylene that adds rigidity and provides a sufficient sealing surface for the air stem. The air connector 90 has first and second ends 92 and 94 and a passage 96 extending therethrough. A radially inwardly extending portion 98 having an opening 100 extends from an inner wall that defines the passage 96 to separate the passage 96 between an upper portion 102 and a lower portion 104. Threads 106 are provided on the inner wall at the upper portion 102 that may be a suitable thread, such as one and one quarter inch NPT threads. An air stem 108 can be received in the opening 100 with a first portion 110 extending in the upper portion 102 and a second portion 112 extending in the lower portion 104. The first portion 110 sits below the first end 92, for example to prevent damage to the air stem 108 and to allow standard air-chucks to be attached for charging the tank 10 with air or gas or for removing air or gas from the tank, and can be covered by a suitable cover 122. In an embodiment, the air connector 90 can be provided without the air stem 108 and the radially inwardly extending portion 98 can be drilled out allowing the NPT threads to be utilized in a retention tank application.

Figure 9:
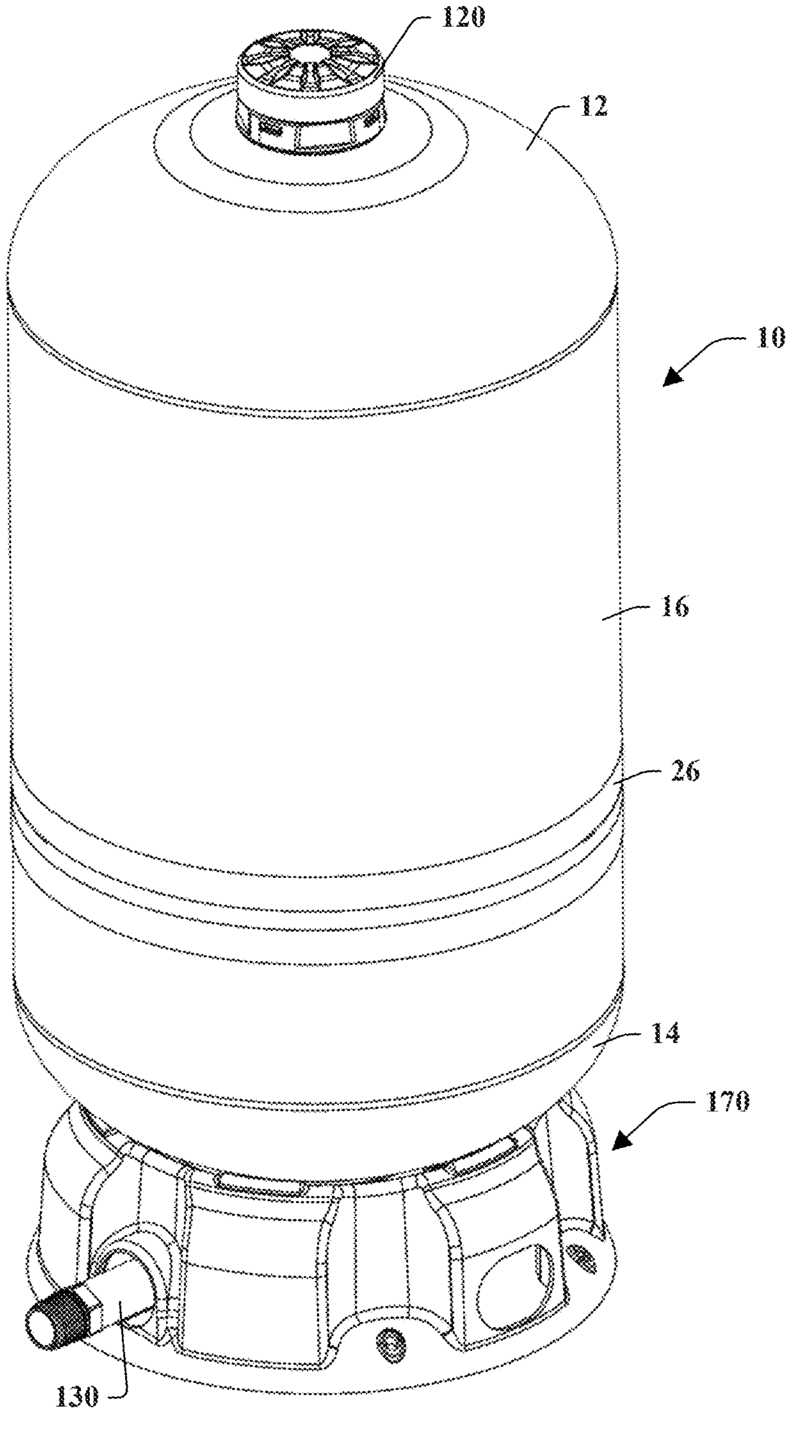
FIG. 9 is a perspective view of an exemplary tank assembly.

The air connector 90 also includes threads 114 along an outer surface for mating with the threads 66 of the connection 58, and a flange 116 extending outward for abutting the second end 42 of the upper dome 12. The threads 114 may be a suitable thread, such as a two and one half inch NPSM thread utilized in the water treatment industry. A suitable seal 124 is configured to be received in the seat formed by the annular rib 56 and sandwiched between the annular rib 56 and the flange 116. The air connector 90 may also include a polygonal raised portion 118 at the first end 92, such as a pentagon shaped portion, for torqueing the air connector 90 onto the connection 58. The shaped of the polygonal raised portion 118 is designed to prevent tampering from standard wrenches. As shown in FIGS. 9 and 11, a cap 120 can be attached to the air connector 90 to cover the air stem 108.

Turning now to FIGS. 12-15, an exemplary connector 130, such as a threaded elbow connector is configured to be coupled to the connection 58 of the lower dome 14. The connector may be made of a suitable material, such as polyvinyl chloride, and may be made in a suitable manner, such as injection molding. The connector 130 includes an inlet portion 132 and a conduit 134 extending substantially perpendicular to the inlet portion 132. The inlet portion 132 and the conduit 132 each have a respective through passage 136 and 138 fluidly connected to one another to direct flow ninety degrees relative to the connection 58. The inlet portion 132 includes threads 140 along an outer surface for mating with the threads 66 of the connection 58 attached to the lower dome 14, a pair of ears 142 opposite one another extending above the threads 140 and each having an opening 144, and a flange 146 extending outward below the threads 140 for connection to a support stand. The threads 140 may be a suitable thread, such as a two and one half inch NPSM thread utilized in the water treatment industry.

Figure 14:
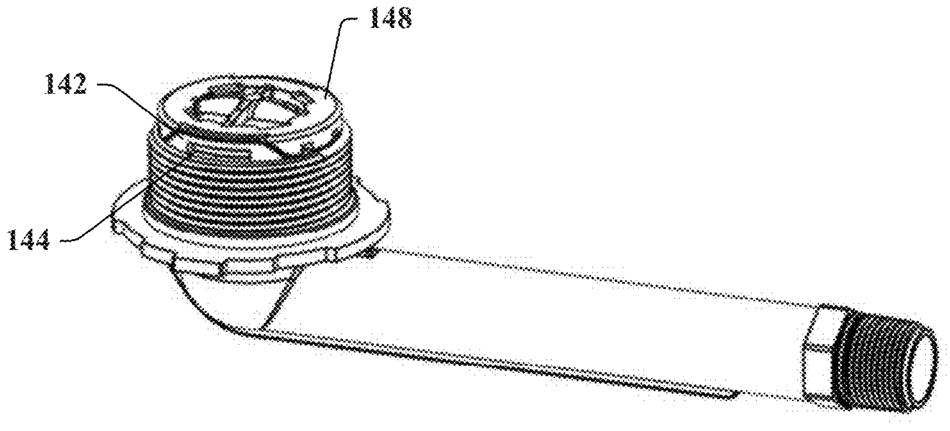
FIG. 14 is a perspective view of the connection with a turbulator.
Figure 15:
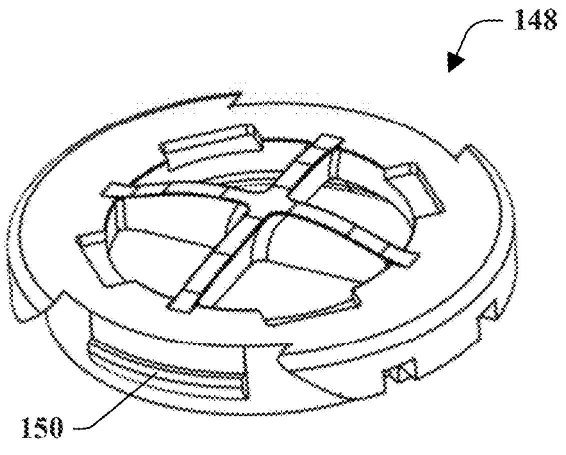
FIG. 15 is a perspective view of the turbulator.

As shown in FIGS. 14 and 15, the ears 142 are configured to connect to a turbulator 148 via protrusions 150 extending outward from the turbulator 148 that are received in the openings 144. It will be appreciated that another suitable connector, such as a support or a diffuser may connect to the ears 142, such as by a snap-in connection. A suitable seal, such as O-ring 152 (FIG. 18) can be received on the inlet portion 132 to be received in the seat formed by the rib 56 to seal the inlet portion 132 to the connection 58 and neck 46. If there is a leak between the neck 46 and the connection 58, the leak path would be blocked by the seal 152 to prevent leakage around the connector 130.

Figure 18:
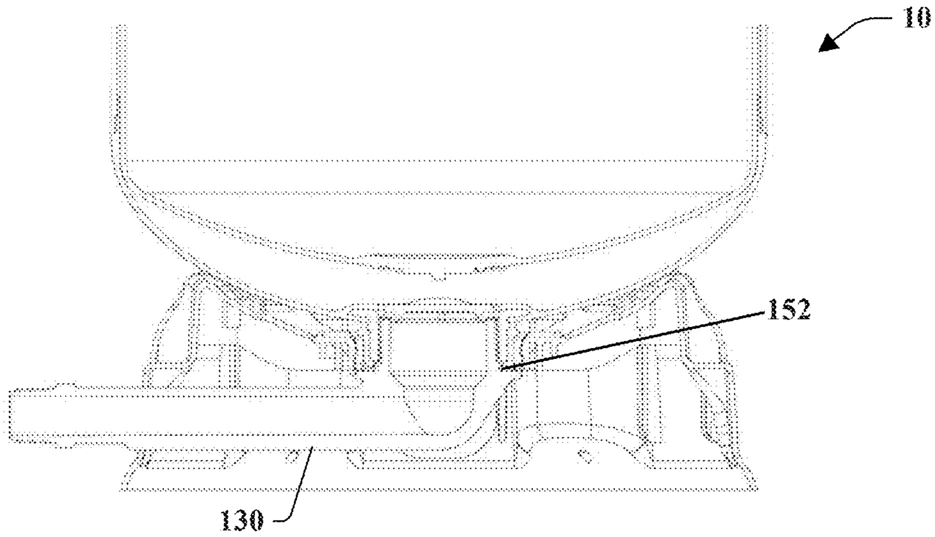
FIG. 18 is a partial cross-sectional view of the tank attached to the support stand and the connection.

Referring now to the conduit 134, the conduit 134 includes a molded-in hex 160 with threads 162 adjacent thereto for connection to another conduit. The threads 162 may be a suitable thread, such as one and one quarter inch NPT threads or one-inch NPT threads. In an embodiment, the hex 160 and threads 162 could be removed by a user, for example cut off by a plumber, and a suitable conduit could be glued to the conduit 134. The length of the conduit 134 is sized such that the conduit can extend through and beyond a sidewall of the support stand a sufficient distance allowing the hex 160 and threads 162 to be removed and the end of the conduit still extend past the sidewall as shown in FIG. 18. The conduit 134 also includes a support rib 164 on an underside thereof configured to bottom out on the support stand when weight is applied to the connector 130 to impeded downward movement of the conduit 134 and transfer stress to the support stand, for example if a user stepped on the conduit 134. As shown, the support rib 164 extends substantially along the length of the conduit 134.

Figure 16:
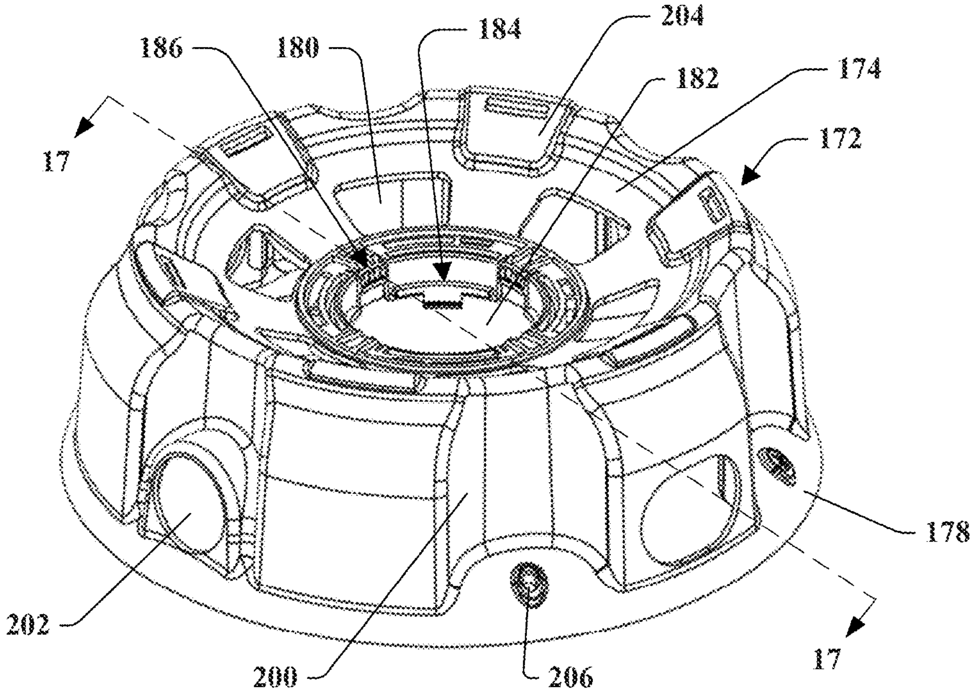
FIG. 16 is a perspective view of a support stand configured to attach to the tank.
Figure 17:
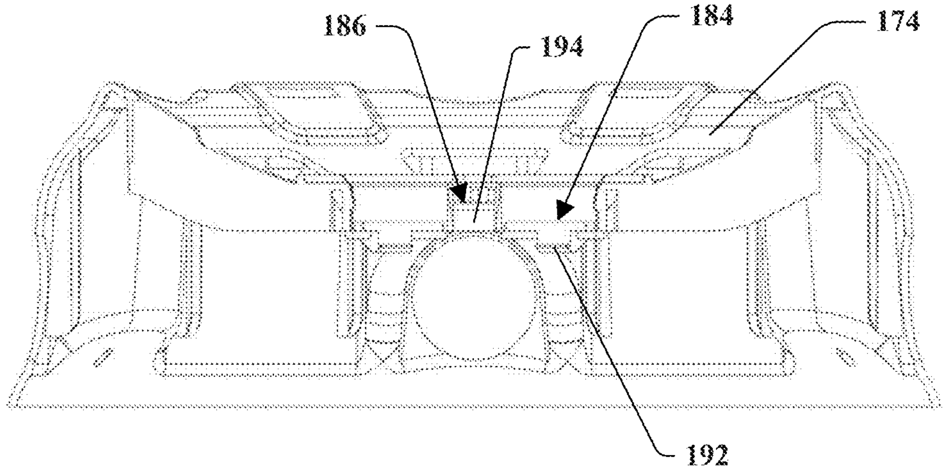
FIG. 17 is a cross-sectional view of the support stand taken about line 17-17 in FIG. 16.

Turning now to FIGS. 16-18, an exemplary support stand for connection to the tank 10 is shown at reference numeral 170. The support stand 170 may be made of any suitable material, such as a polymer, such as a polypropylene copolymer, and made in a suitable manner, such as injection molding. The support stand 170 includes a support body 172 having an upper wall 174, a sidewall 176 extending downwardly from the upper wall 174, and a lower wall 178 extending downward from a lower end of the sidewall 176. A plurality of circumferentially spaced drainage apertures 180 are defined in the upper wall 174 that are adapted to permit airflow and drainage of a liquid through the upper wall 174.

Figure 19:
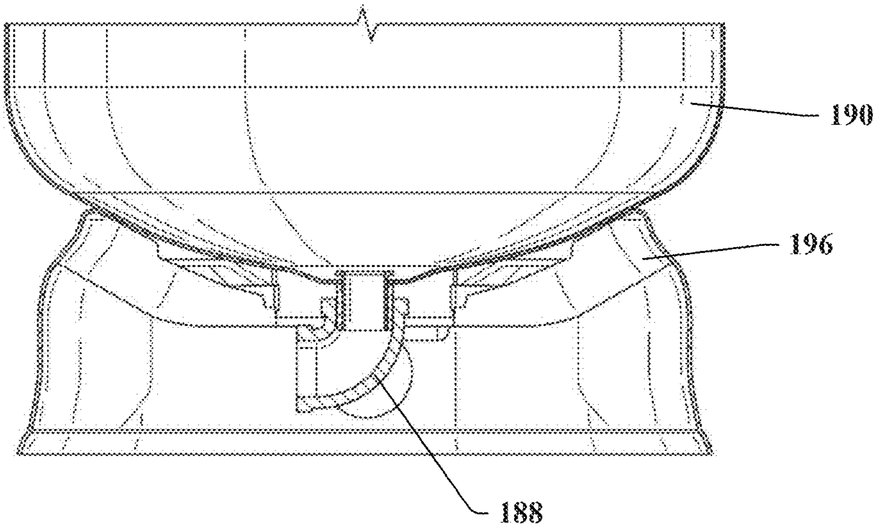
FIG. 19 is a partial cross-sectional view of a metal tank attached to the support stand and a connection.

Also defined in the upper wall 174 is a locking aperture 182 that permits passage of components of the tank 10. As shown in FIG. 17, extending from the locking aperture 182 are first and second attachment mechanisms 184 and 186 for attaching to the connector 130 as shown in FIG. 18 or a connector 188 attached to a metal tank 190 as shown in FIG. 19. The first attachment mechanism 184 includes a plurality of spaced tabs 192 that connect to the flange 146 of the connector 130, for example via snap connection, to secure the connector 130 to the stand to allow the tank 10 to be threadably connected to the connector 130/stand 170 via the connection 58. The second attachment mechanism 186 includes one or more tabs 194 that connect to a ring 196 attached to the tank 190, for example by welding, and then the connector 188 is secured to the ring 196.

The sidewall 176 includes a plurality of circumferentially spaced concave recesses 200 that enhance the rigidity of the support body 172 and provide for increased strength when rolling the tank 10, and a plurality of circumferentially spaced access apertures 202 through which the conduit 134 of the connector 130 may extend. In an embodiment, four access apertures 202 may be provided for utilization in the water treatment industry. The sidewall 176 also includes a plurality of circumferentially spaced standoffs 204 that can alternate with the recesses to facilitate air circulation below the underside of the tank, for example to help prevent buildup of condensation, and a plurality of openings 206 in the lower wall to allow the support stand 170 to be attached a floor or other component as described below.

Figure 20:
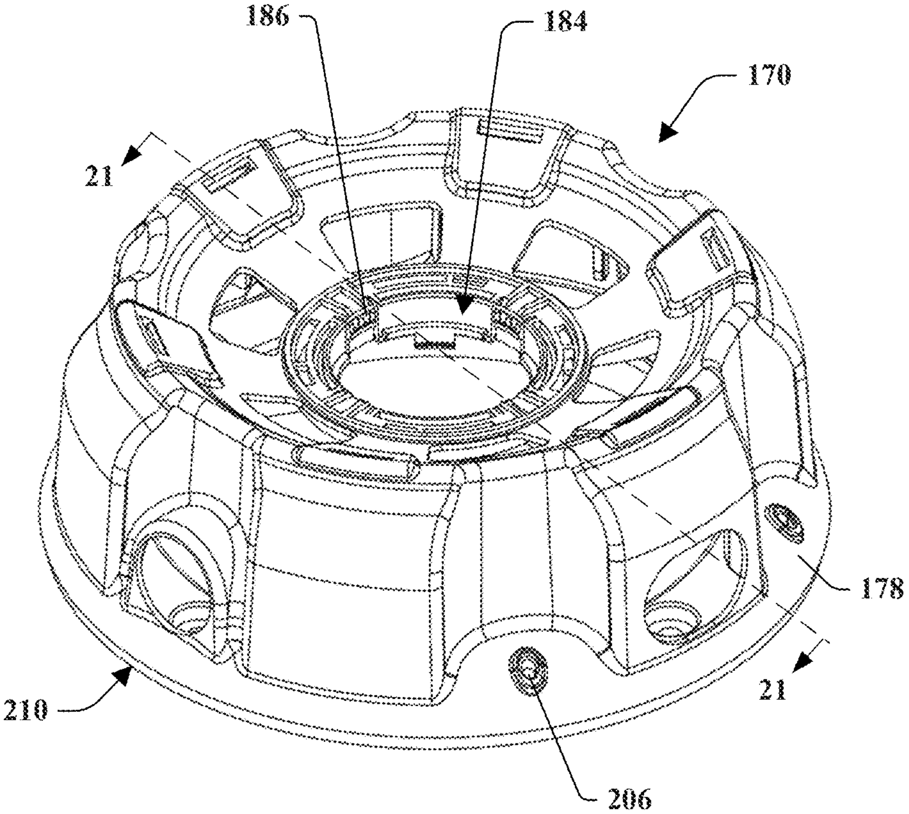
FIG. 20 is a perspective view of a support stand on a leveling ring.
Figure 21:
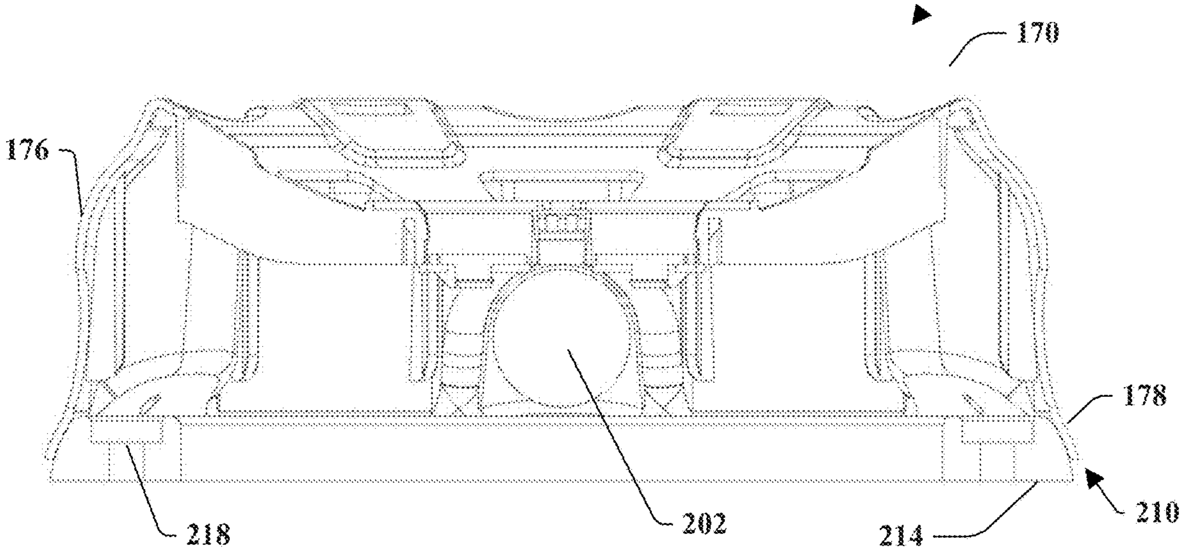
FIG. 21 is a cross-sectional view taken about line 21-21 in FIG. 20.
Figure 22:
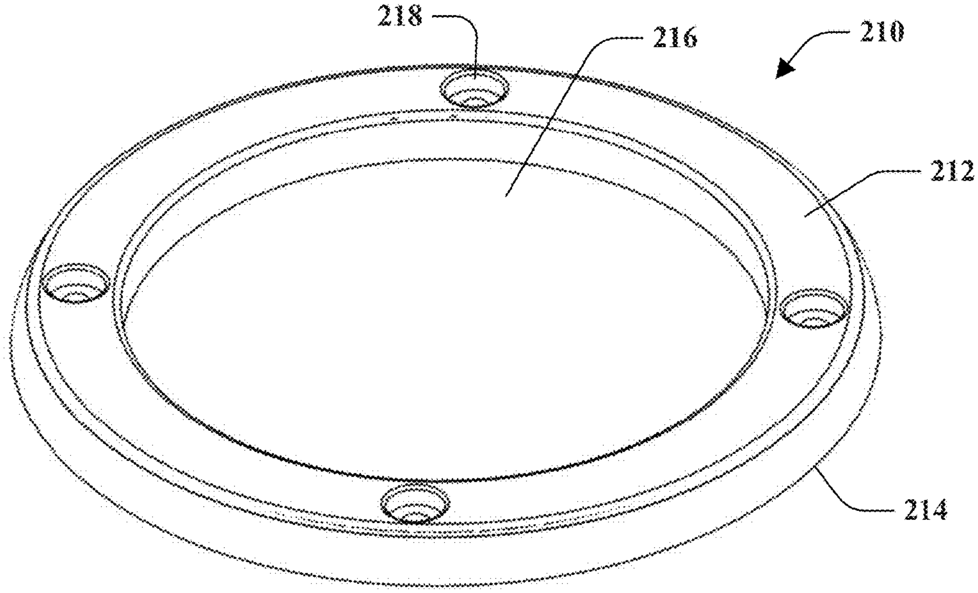
FIG. 22 is a perspective view of the leveling ring.

Turning now to FIGS. 20-22, the support stand 170 is shown with a leveling ring 210. The leveling ring 210 has a geometry corresponding to a geometry of the support stand 170 at the lower wall 178 to allow the support stand 170 to abut the leveling ring 210 and be moved relative to the leveling ring to level the tank 10. The leveling ring 210 has a first end 212 configured to be abutted by an underside of the lower wall 178, a second end 214 configured to abut a surface, such as a floor in a building, and an opening 216 extending therethrough for material savings. The leveling ring 210 can include one or more openings 218, such as a plurality of circumferentially spaced openings 218 for receiving a fastener to secure the leveling ring to the floor providing for seismic restraint. It will be appreciated that the leveling ring 210 may be secured to a floor in other suitable manners.

To attach the support stand 170 to the leveling ring 210, the leveling ring 210 is positioned on the surface and optionally attached to the surface. The support stand 170 is then lowered onto the leveling ring 210 and the support stand 170 swiveled relative to the leveling ring 210. A suitable level may be provided that is placed on the top of the tank 10 or integrated with the tank for an operator to confirm that the tank 10 is leveled. Once leveled, suitable fasteners are inserted through the openings 206 and into the leveling ring 210 to secure the support stand 170 and thus the tank 10 relative to the leveling ring 210. By leveling the tank the service life of the diaphragm will be increased due to uniform actuation.

Figure 23:
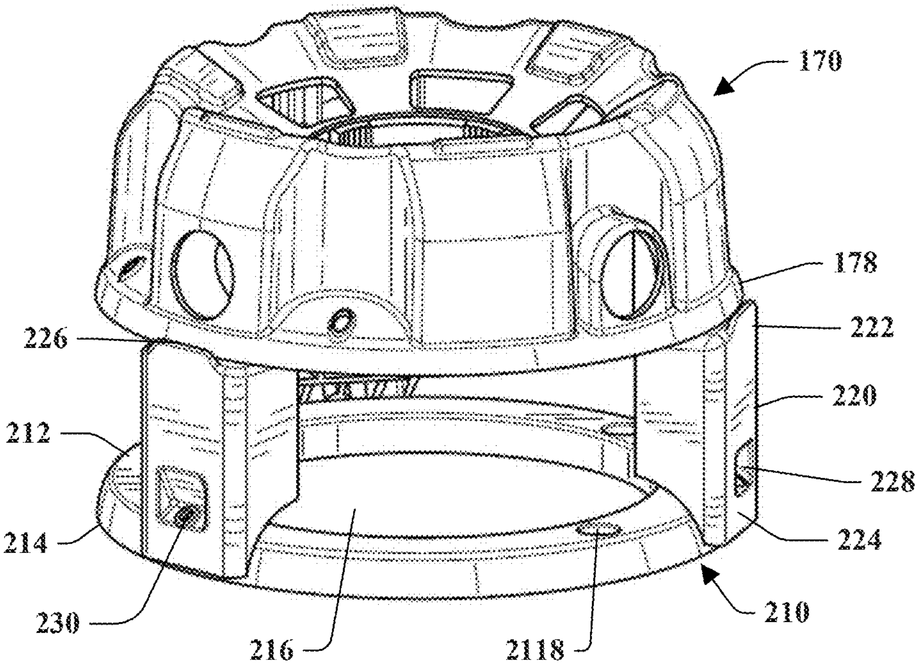
FIG. 23 is a perspective view of the support stand elevated above the leveling ring by legs.

Turning now to FIG. 23, an embodiment for elevating the support stand 170 is shown. In some instances it is desirable to raise the tank 10 a predetermined distance above ground level, such as eighteen inches, for example to meet code requirements. To raise the support stand 170, a plurality of legs 220, such as three circumferentially spaced legs 220 may be provided. Each leg 220 has a first end 222 against which the lower wall 178 of the support stand 170 abuts and a second end 224 that abuts the leveling ring 210. Projecting upward from each first end 222 is a standoff 226 that abuts an outer edge of the lower wall 178 to hold the support stand 170 in position. In an embodiment, the support stand 170 can be secured to the legs 220 by a snap-in feature or a suitable fastener.

The second end 224 of each leg 220 has a geometry corresponding to the geometry of the leveling ring 170 to allow the legs 220 to be moved relative to the leveling ring 210 for leveling the tank 10 in a similar manner that the support stand 170 is moved relative to the leveling ring 210 discussed above regarding FIG. 20. A cavity 228 is provided proximate each second end 224 where an opening 230 is provided for receiving a suitable fastener to secure the legs 220 to the leveling ring 210.

Figure 24:
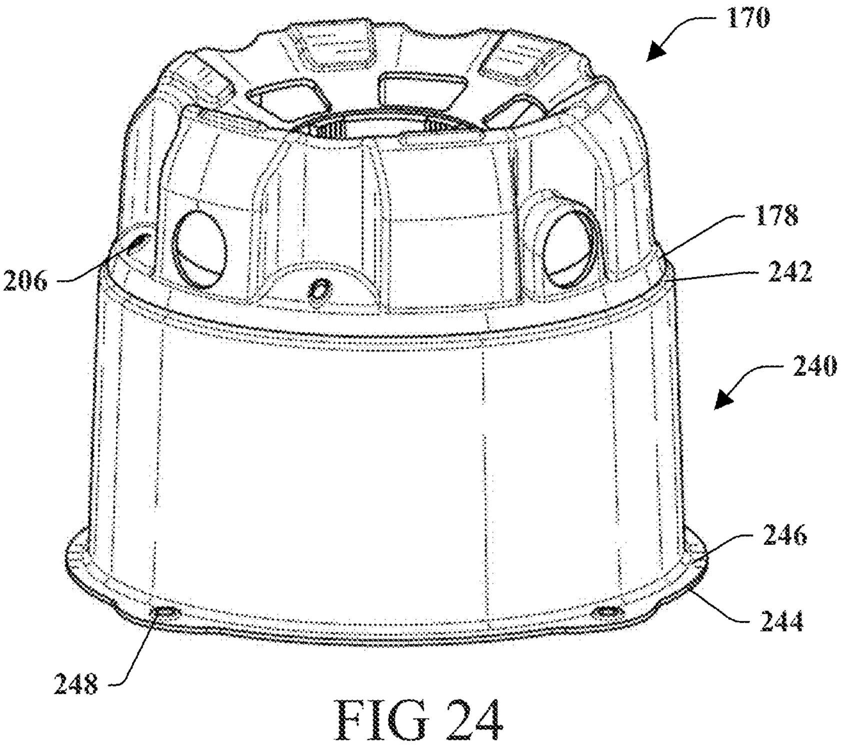
FIG. 24 is a perspective view of the support stand on a leveling base.

Turning now to FIG. 24, another embodiment for elevating the support stand 170 is shown. In this embodiment, a leveling base 240 is provided that has a first end 242 configured to be abutted by an underside of the lower wall 178 and a second end 244 configured to abut a surface, such as the floor in a building. The leveling base 240 has a geometry at the first end 242 corresponding to a geometry of the support stand 170 at the lower wall 178 to allow the support stand 170 to abut the leveling base 240 and be moved relative to the leveling base to level the tank 10. The leveling base 240 includes a flanged portion 246 at the second end 244 that includes one or more openings 248, such as a plurality of circumferentially spaced openings 248 for receiving a fastener to secure the leveling base to the floor providing for seismic restraint. It will be appreciated that the leveling base 240 may be secured to a floor in other suitable manners.

To attach the support stand 170 to the leveling base 240, the leveling base 240 is positioned on the surface and optionally attached to the surface, for example via fasteners received in openings 248. The support stand 170 is then lowered onto the leveling base 240 and the support stand 170 swiveled relative to the leveling base 240. A suitable level may be provided that is placed on the top of the tank 10 or integrated with the tank for an operator to confirm that the tank 10 is leveled. Once leveled, suitable fasteners are inserted through the openings 206 and into the leveling base 240 to secure the support stand 170 and thus the tank 10 relative to the leveling base 240.

Figure 25:
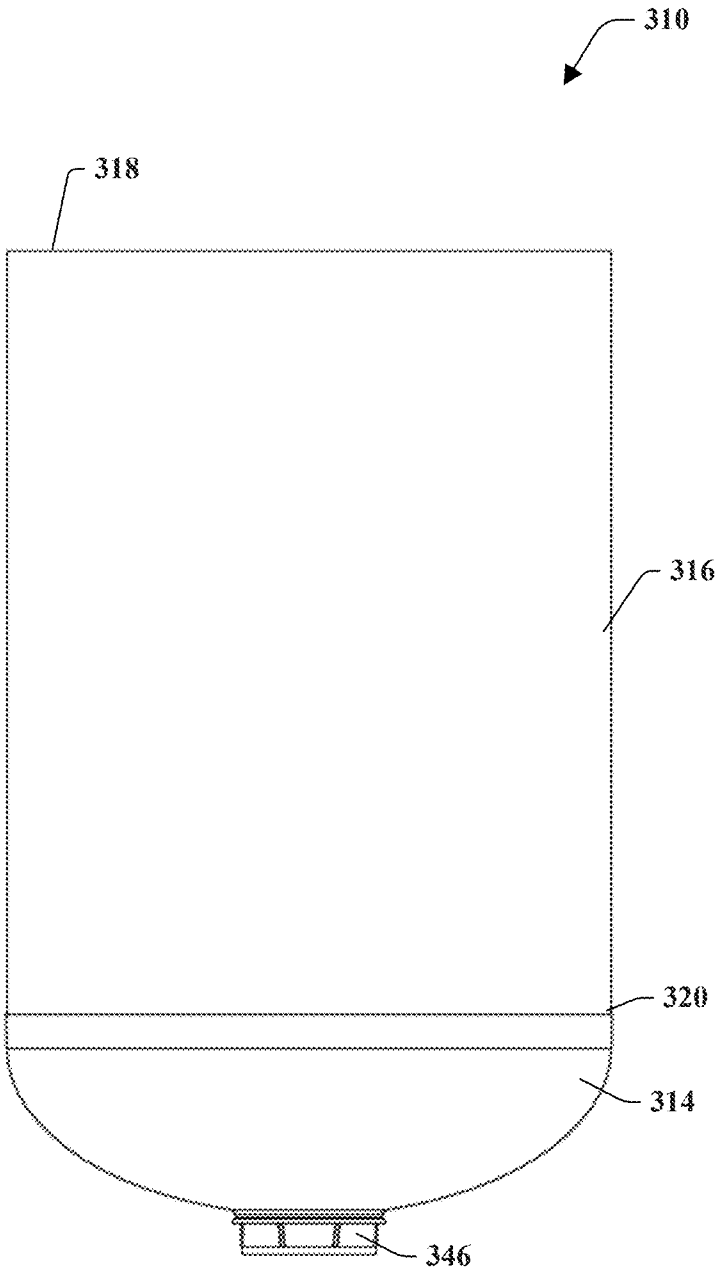
FIG. 25 is a perspective view of a portion of another exemplary tank.
Figure 26:
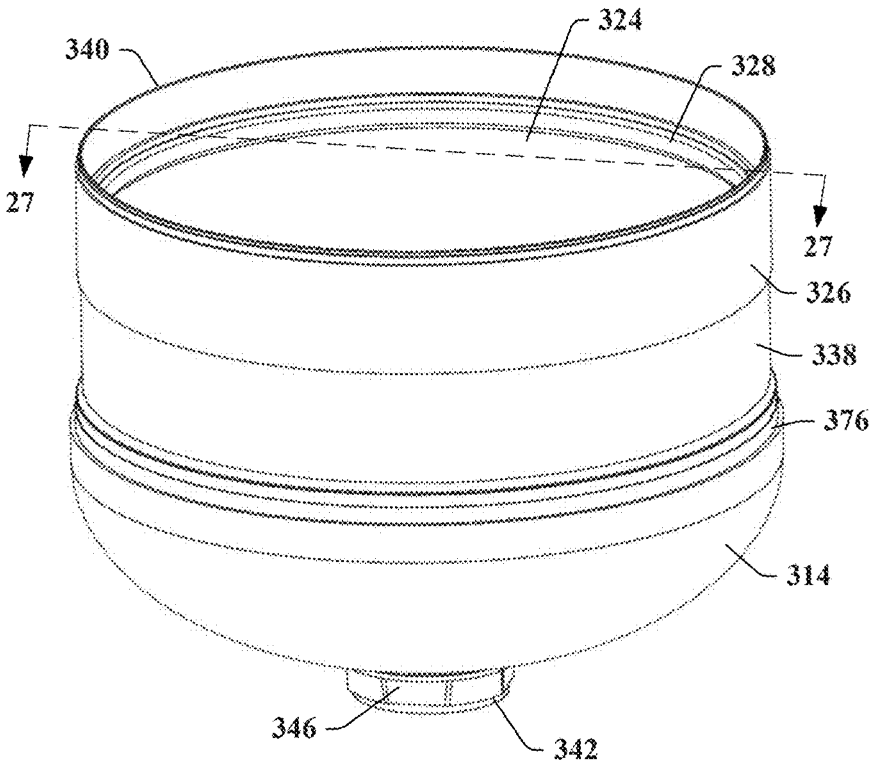
FIG. 26 is a perspective view of a portion of the tank.
Figure 27:
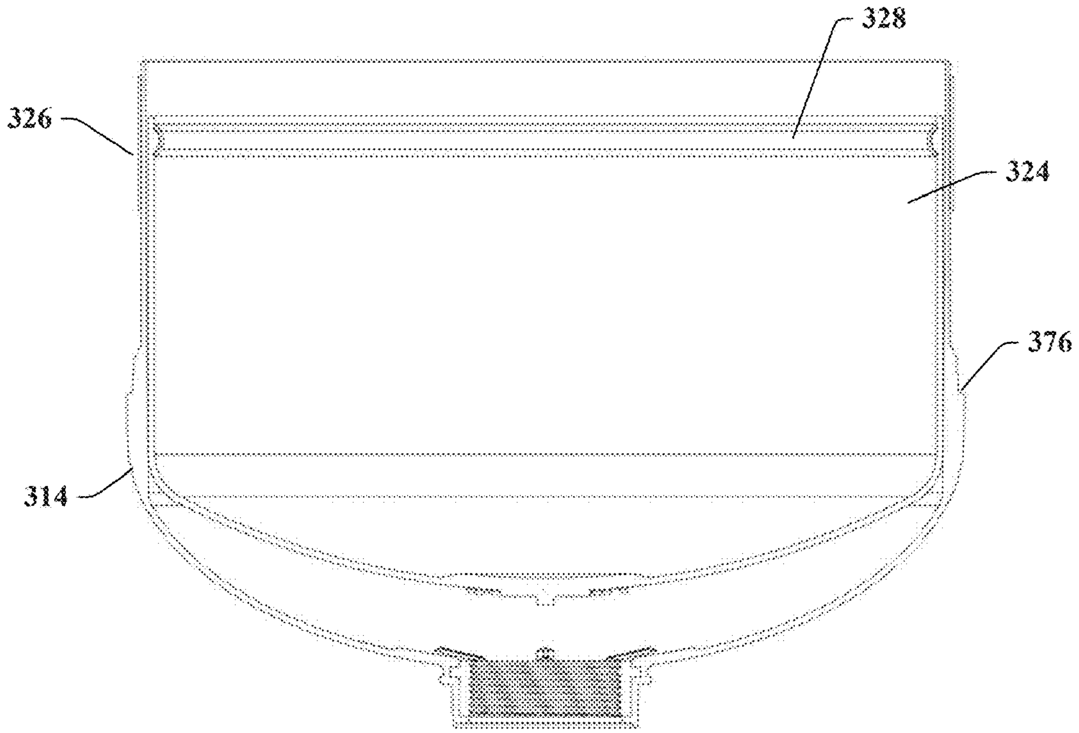
FIG. 27 is a cross-sectional view taken about line 27-27 in FIG. 26.

Turning now to FIGS. 25-27, an exemplary embodiment of the tank is shown at 310. The tank 310 is substantially the same as the above-referenced tank 10, and consequently the same reference numerals but indexed by 300 are used to denote structures corresponding to similar structures in the tanks. In addition, the foregoing description of the tank 10 is equally applicable to the tank 310 except as noted below.

The fluid tank 310 includes an upper dome (not shown), a lower dome 314, and a shell 316 having a first end 318 connected to the upper dome and a second end 320 connected to the lower dome. The upper dome, lower dome 314, and shell 316 form a cavity 322 for receiving a diaphragm 324 that is held in position by an outer band 326 and an inner hoop ring 328. The upper dome, the lower dome 314, and the shell 316 may be made of a suitable material, such as a polymer, such as a polyolefin, such as a polypropylene copolymer, and may be a suitable color, such as black or dark blue to prevent bacteria growth. In an embodiment, the upper dome, lower dome 314, and shell 316 may be gas assist injection-molded components. The gas assist injection molding allows for thicker wall thicknesses without sink marks, the control of tighter tolerances, and aids with insulation on the dome. In an embodiment, an antimicrobial liner and/or antimicrobial dome may be provided in the cavity 322.

The upper dome and the lower dome 314 each have a first end 340, a second end 342, and a neck 346 at the second end 342 as described above regarding the tank 10. The diaphragm 324 is connected to the lower dome 314 before shell 316 is connected to the lower dome 314, and may be positioned and pushed inside the lower dome 314 to a programmed location by a mandrel. The inner hoop ring 328 is operatively connected to an inner surface of the diaphragm 324 to hold the diaphragm 324 in place against the lower dome 314. The outer band 326 can be inserted over the lower dome 314 and located in a suitable manner, such as by a molded-in tab on the lower dome 314. The outer band 326 can be grooved such that a hoop groove of the band 326 mates with a hoop groove of the lower dome 314, and the hoop groove of the lower dome 314 mates with the inner hoop ring 328 to pinch the diaphragm 324 between the hoop groove of the lower dome 314 and the inner hoop ring 328. It is contemplated that outer band 326 and inner hoop ring 328 are made from a metallic material, such as steel. Although described as included the diaphragm 324, it will be appreciated that the tank may be provided without a diaphragm for use in industries such as the water treatment industry.

Once the diaphragm 324 is installed, the shell 316 can be positioned relative to the lower dome 314 and lowered onto the lower dome 314 such that a portion 338 of the lower dome 314 is disposed within the shell 316. In this way, the shell 316 extends past the first end 340 of the lower dome 314 and covers the portion 338 and the outer band 326. As shown, the lower dome 314 includes a ledge 376 extending around the dome 314 that is configured to be abutted by the second end 320 of the shell 316 such that an outer surface of the shell 316 is flush with an outer surface of the lower dome 314 when connected to one another, for example by spin welding, to form a hermetical seal between one another and eliminated uneven surfaces for fiberwinding and reducing stress on the outside surfaces. Once connected, an air gap is formed between the shell 316 and the portion 338 that provides insulation to prevent cold incoming liquid away from the inside of the upper dome 314 eliminating sweating.

Figure 28:
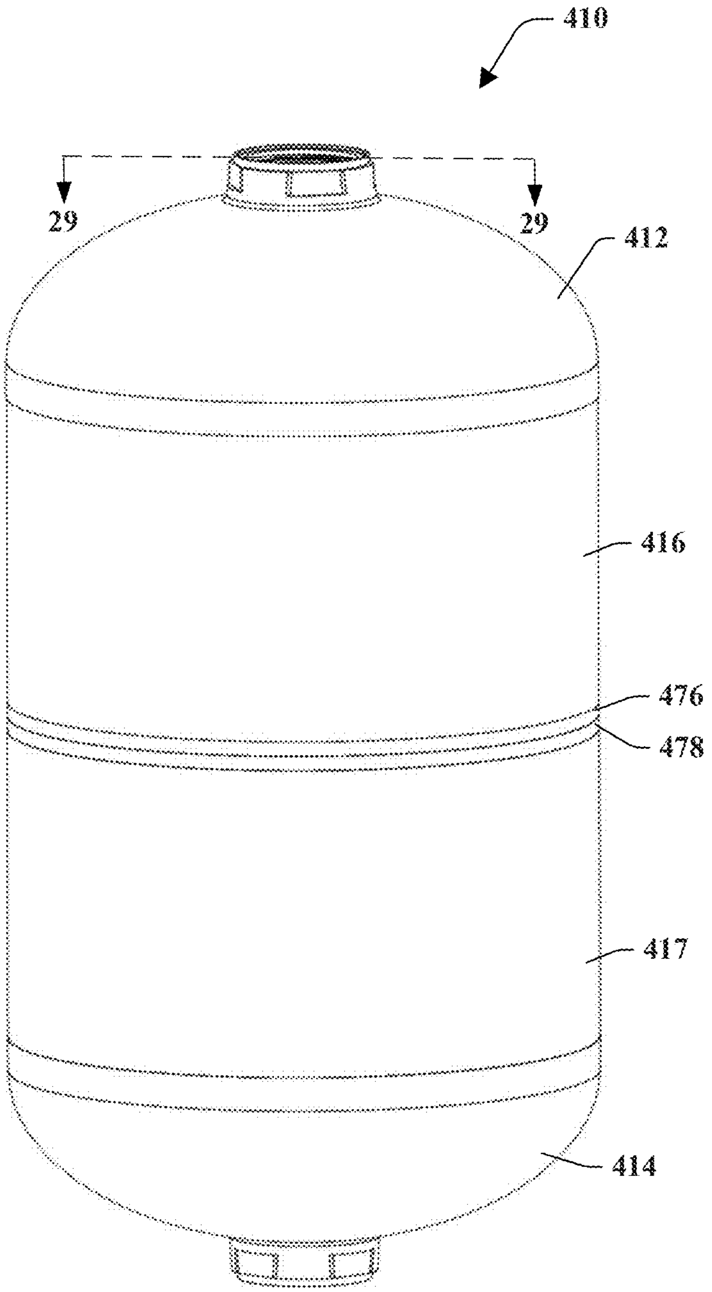
FIG. 28 is a perspective view of yet another exemplary tank.
Figure 29:
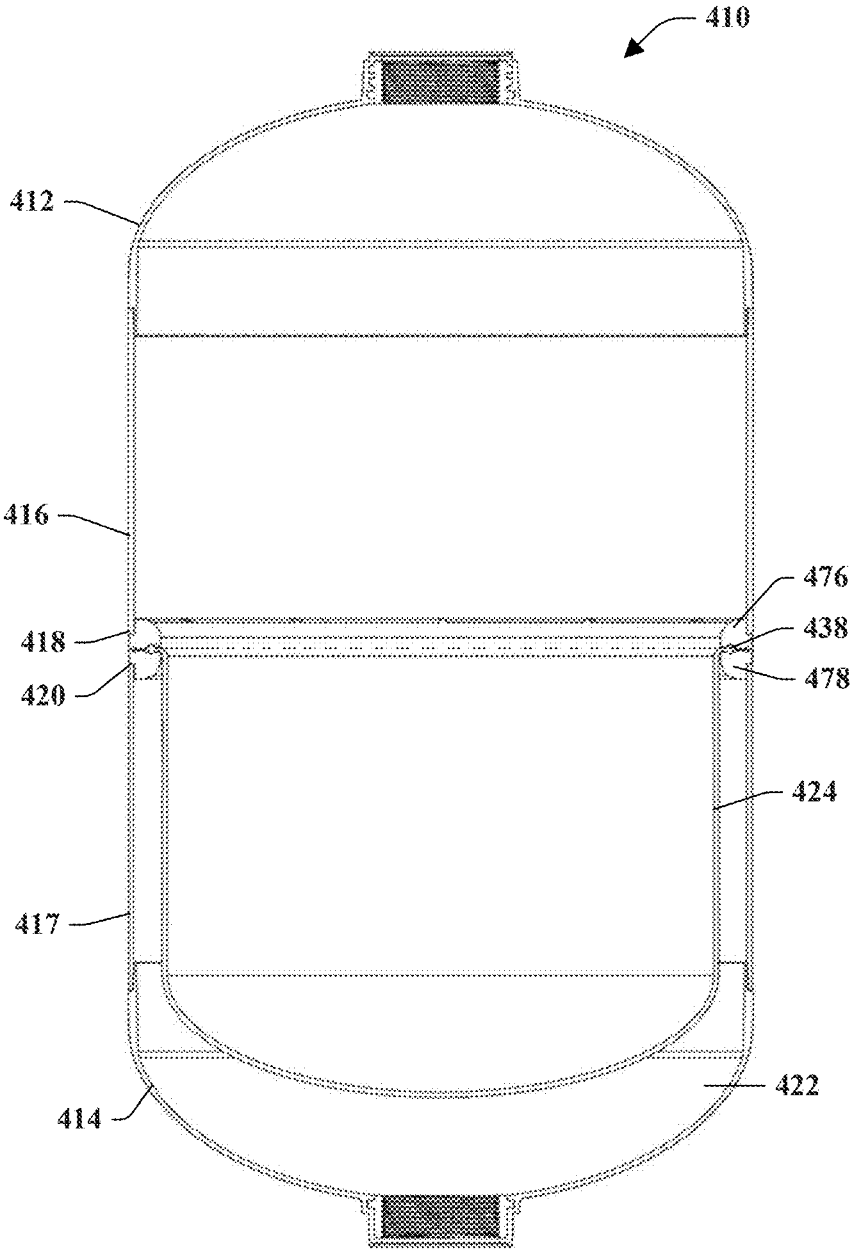
FIG. 29 is a cross-sectional view taken about line 29-29 in FIG. 28.

Turning now to FIGS. 28 and 29, an exemplary embodiment of the tank is shown at 410. The tank 410 is substantially the same as the above-referenced tank 10, and consequently the same reference numerals but indexed by 400 are used to denote structures corresponding to similar structures in the tanks. In addition, the foregoing description of the tank 10 is equally applicable to the tank 410 except as noted below.

The fluid tank 410 includes an upper dome 412, a lower dome 414, an upper shell 416, and a lower shell 417 coupled together and configured to be surrounded by a fiberwinding layer. The upper dome 412, lower dome 414, upper shell 416 and lower shell 417 form a cavity 422 for receiving a diaphragm 424 that is held in position as discussed below. The upper dome 412, lower dome 414, upper shell 416, and lower shell 417 may be made of a suitable material, such as a polymer, such as a polyolefin, such as a polypropylene copolymer, and may be a suitable color, such as black or dark blue to prevent bacteria growth. In an embodiment, the upper dome 412, lower dome 414, upper shell 416, and lower shell 417 may be injection-molded components. The upper dome 412 and the lower dome 414 may be coupled to the upper shell 416 and lower shell 417 respectively in a similar manner as discussed above.

Retainer rings 476 and 478 are provided that are connected to a respective one of the upper and lower shells 416 and 417 at respective ends 418 and 420 in a suitable manner, such as by a spin weld. The diaphragm 424 is then positioned and the shells 416 and 417 brought together such that the retainer rings 476 and 478 abut one another and trap a bead 438 of the diaphragm 424 between one another. The retainer rings 476 and 478 are then coupled together in a suitable manner, such as by a hot plate weld to sandwich the bead 438 between one another to form a hermetical seal. Once coupled, the outer surfaces of the upper and lower shells 416 and 417 will be flush with one another eliminating uneven surfaces for fiberwinding and reducing stress on the outside surfaces.

Figure 30:
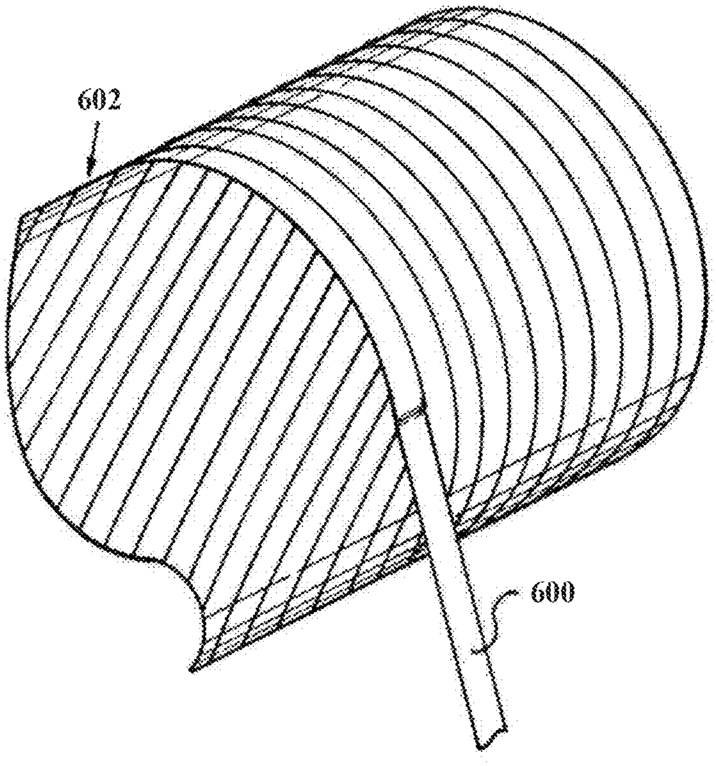
FIG. 30 is a perspective view of an exemplary tank with fiberwinding.
Figure 31:
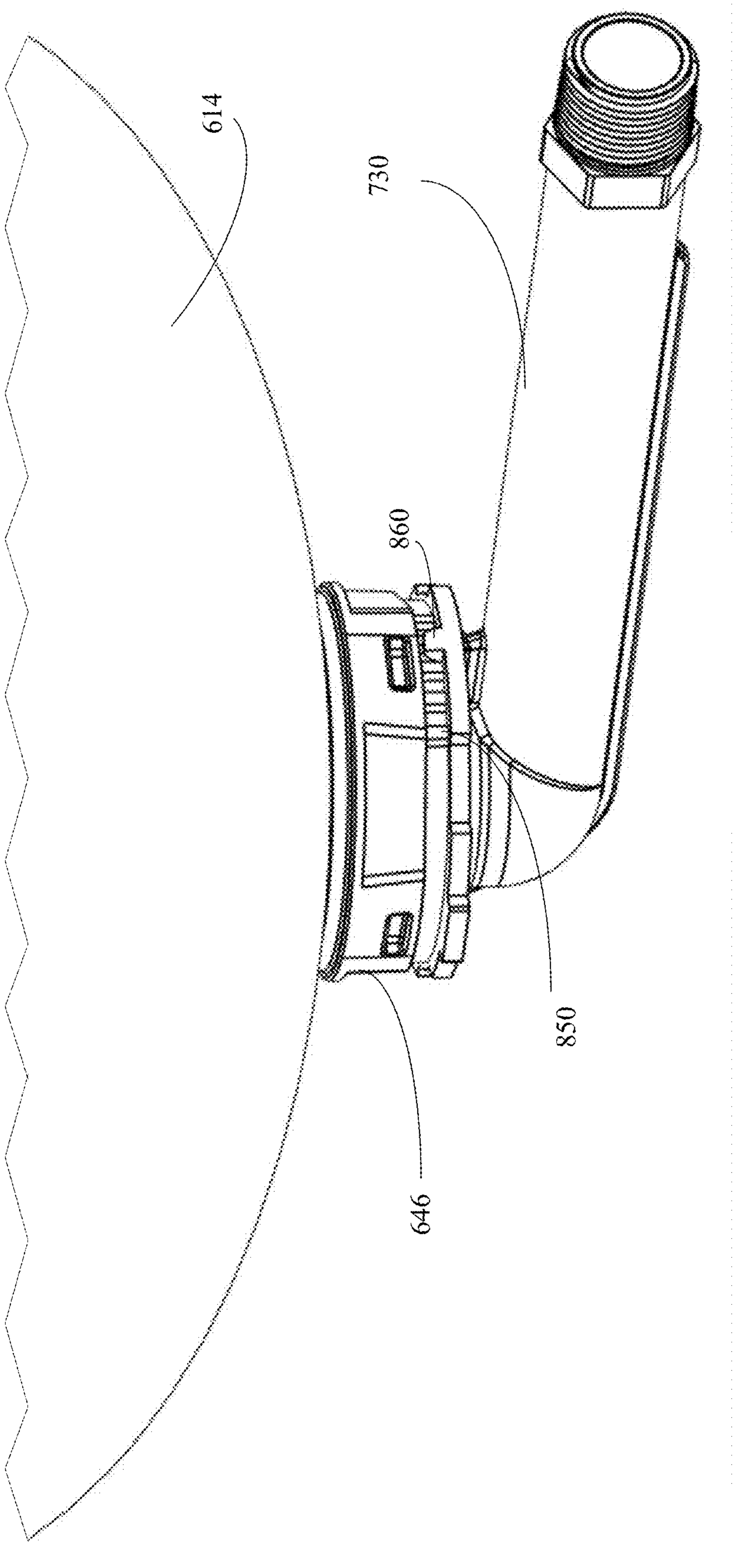
FIG. 31 is a perspective view of a portion of a tank attached to a connection.
Figure 32:
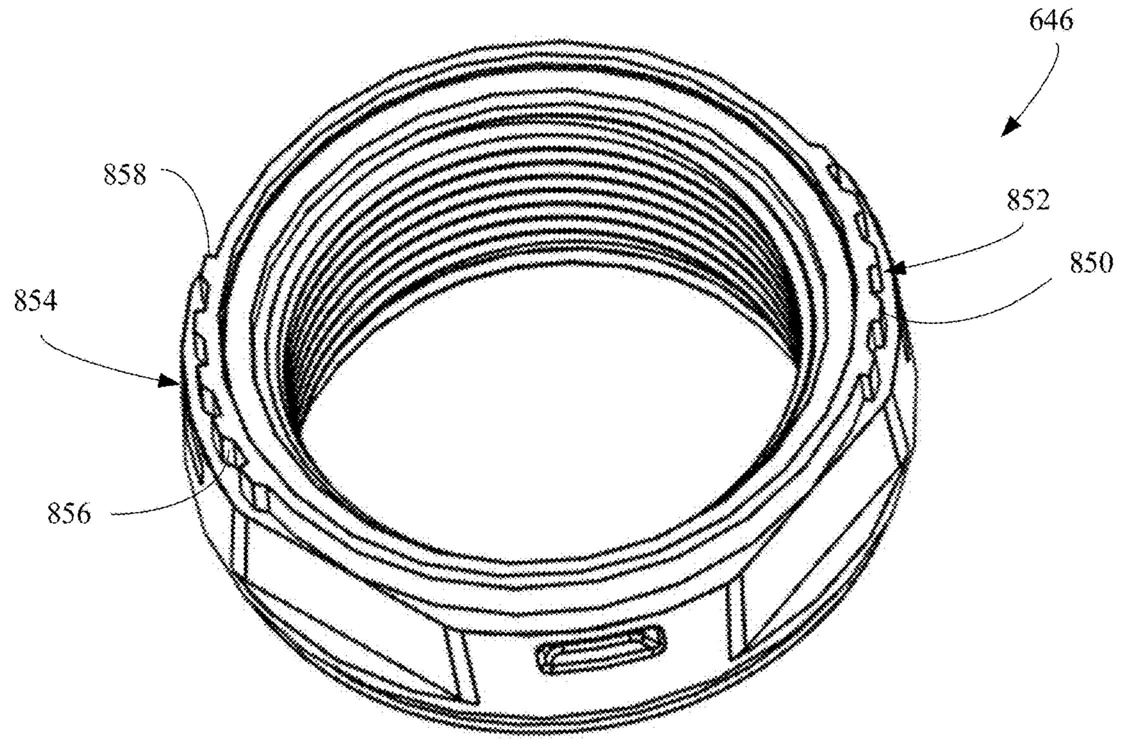
FIG. 32 is perspective view of a portion of the connection.
Figure 33:
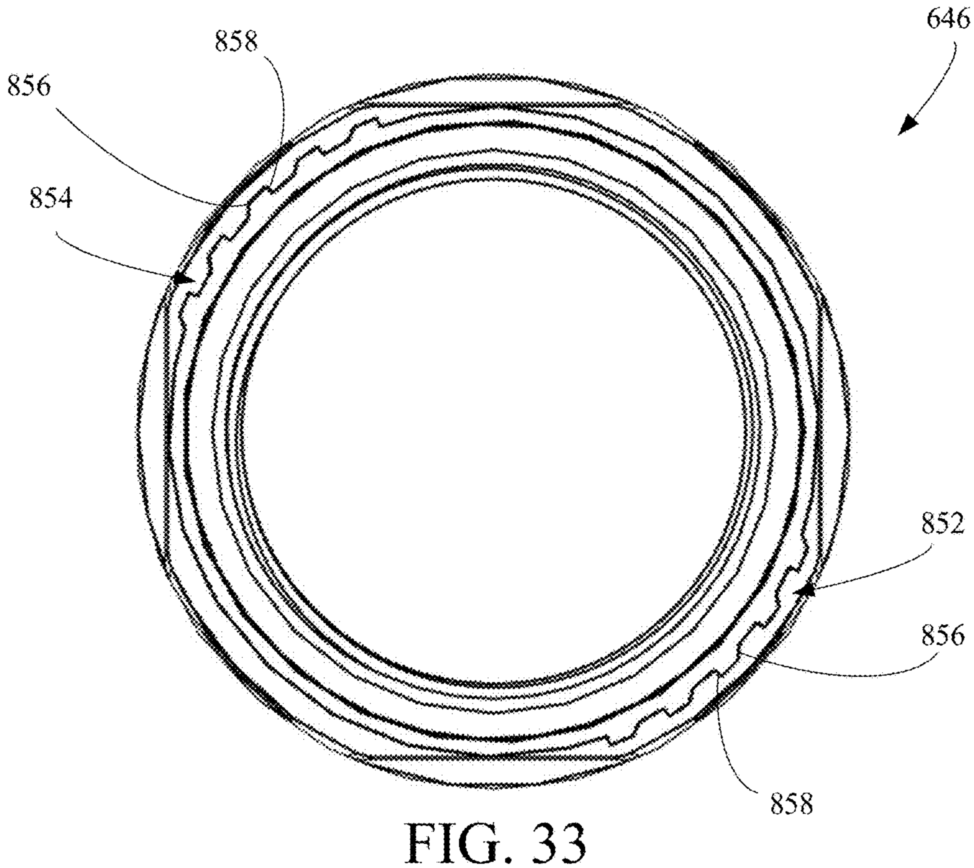
FIG. 33 is a top view of a portion of the connection.
Figure 34:
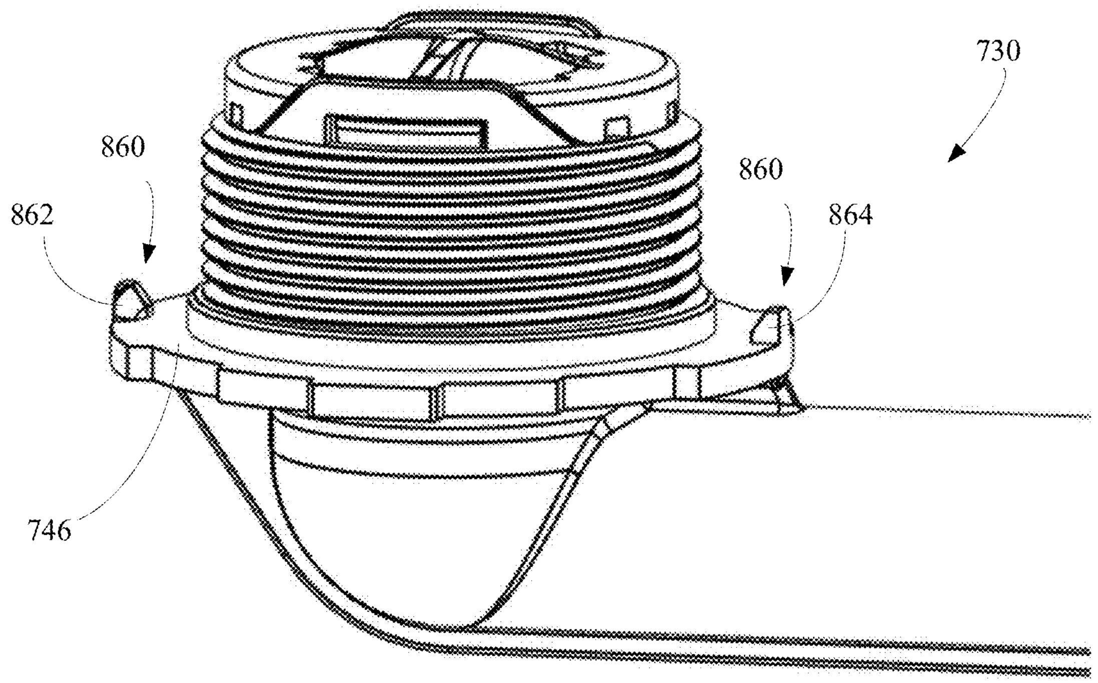
FIG. 34 a perspective view of a neck of a dome.
Figure 35:
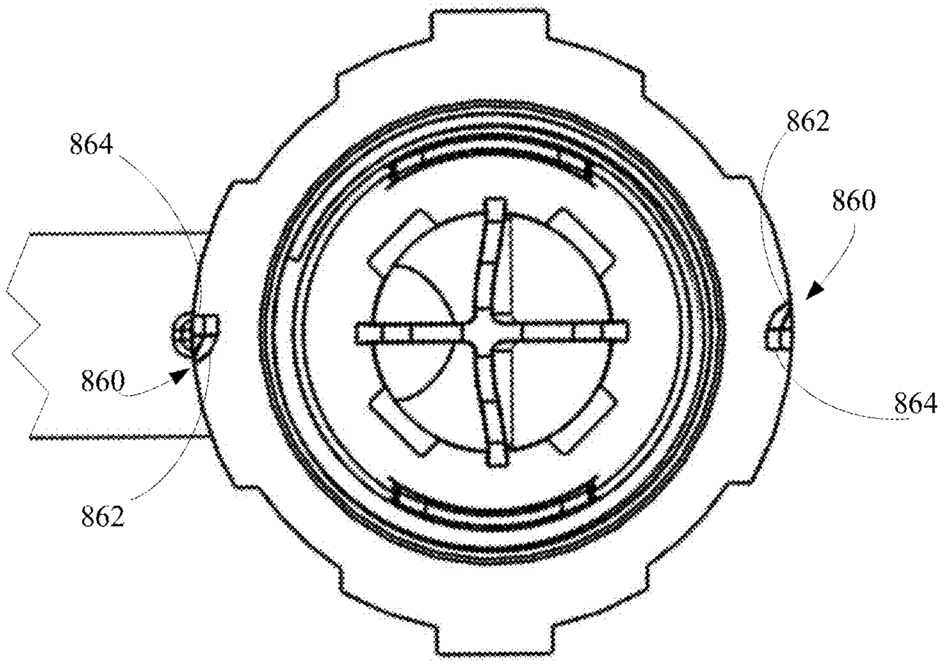
FIG. 35 is a top view of the neck of the dome.
Figure 36:
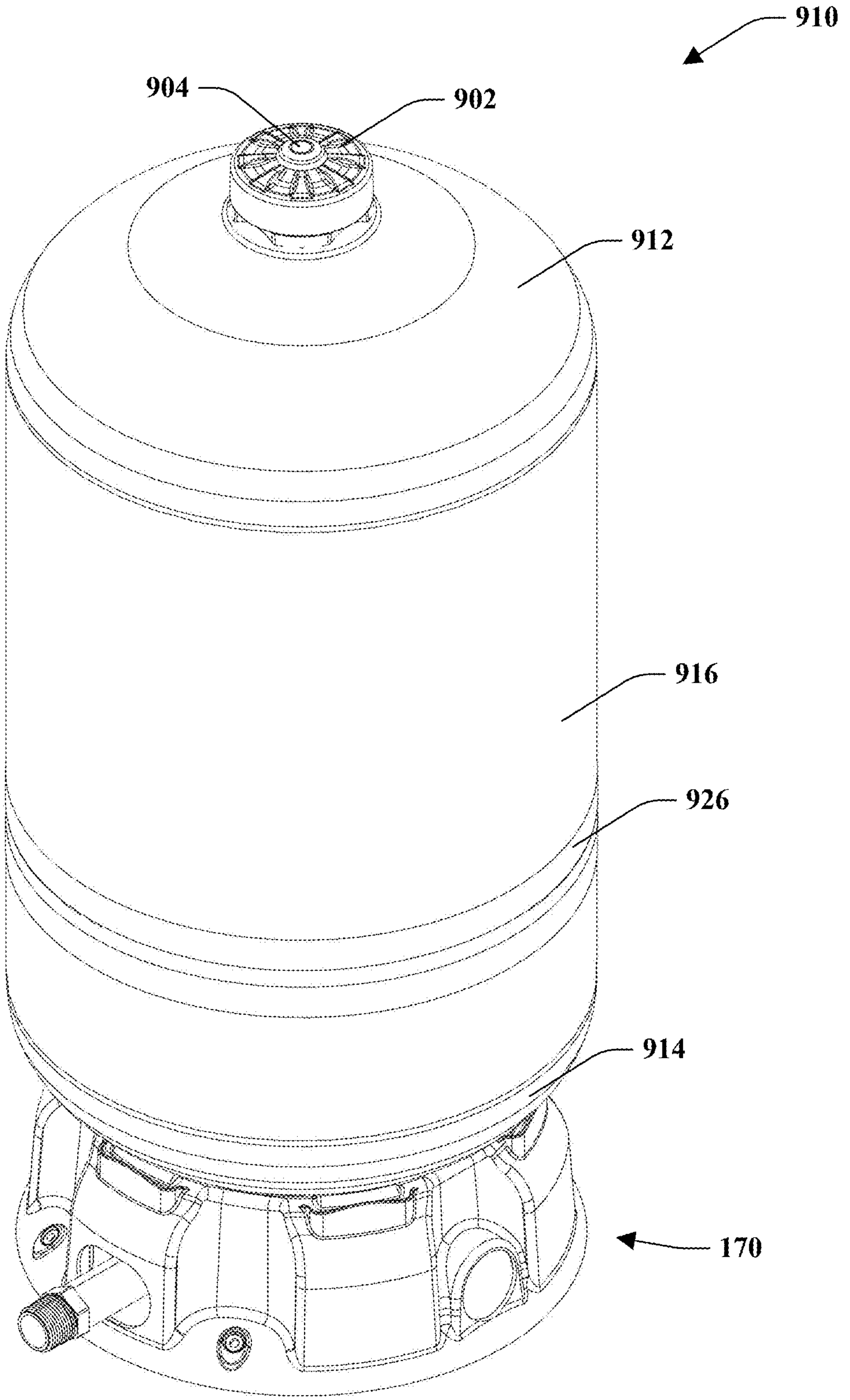
FIG. 36 is a perspective view of an exemplary tank.
Figure 37:
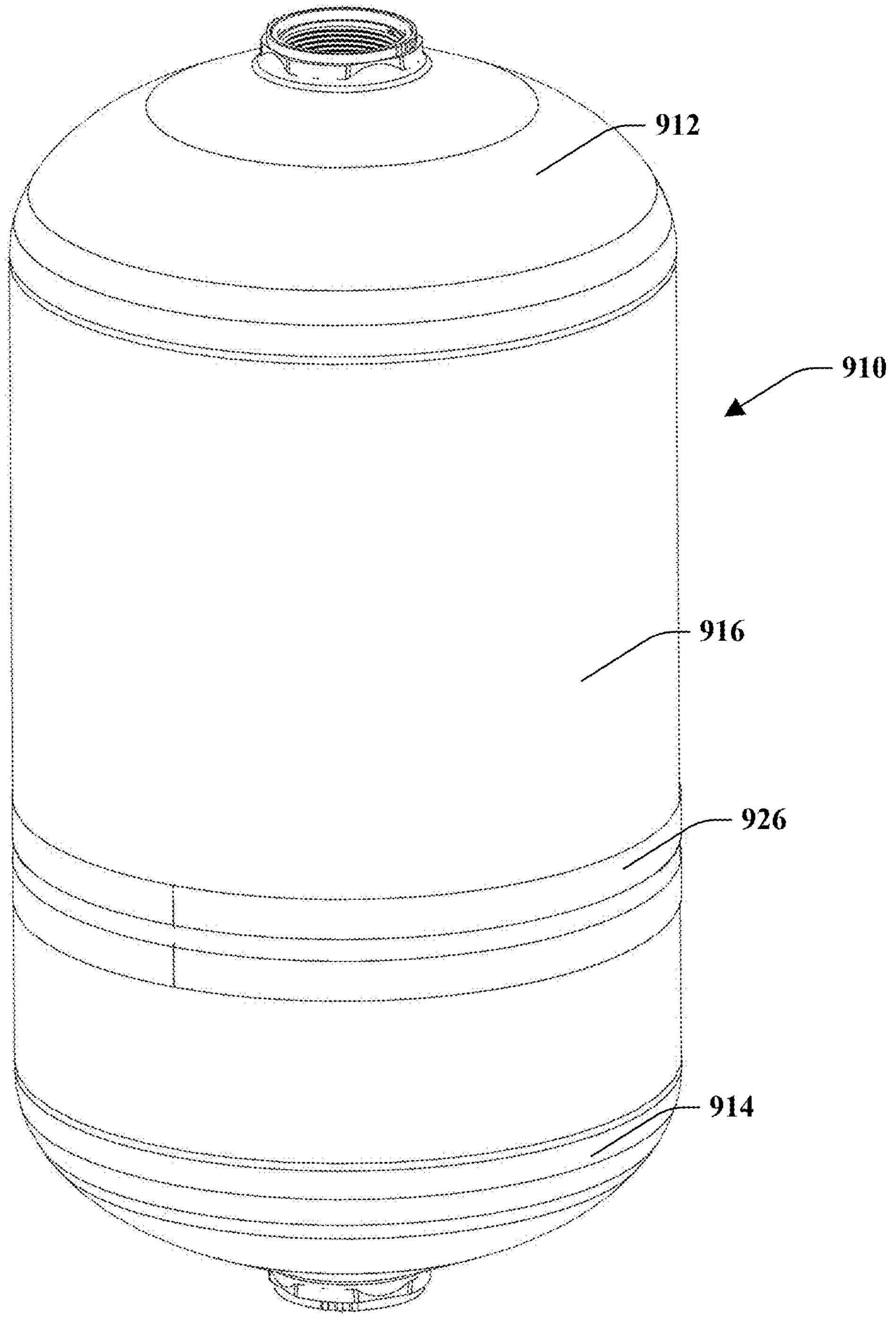
FIG. 37 is a perspective view of an exemplary tank.

Turning now to FIG. 30, an exemplary fiberwinding around the tanks 10, 310, 410, and 510 is shown. The fiberwinding can include multiple layers of fiberwinding 600 that can be helically and circumferentially wrapped. In an embodiment, the fiberwinding can be wrapped over a preliminary fiberwinding layer. An outer fiberwinding layer 602 can be formed of the multiple layers of the fiberwinding 600.

Turning now to FIGS. 31-35, a dome 614 and connector 730 are shown. The dome 614 and connector 730 are substantially the same as the above-referenced dome 614 and connector 130, and consequently the same reference numerals but indexed by 600 are used to denote structures corresponding to similar structures in the domes and connectors. In addition, the foregoing description of the dome 14 and connector 130 is equally applicable to the dome 614 and connector 730 except as noted below. It will be appreciated that dome 614 and connector 730 may be used in place of the dome 14 and connector 130.

The neck 646 of the dome 614 includes one or more ribs 850 on an outer surface thereof, and as illustrated a plurality of circumferentially spaced ribs 850, for example three to five ribs. The neck 646 can include one or more sets of ribs, for example, a first set 852 of the ribs 850 and a second set 854 of the ribs 850 located 180 degrees from the first set 852 of ribs 850 to provide additional holding strength to resist unthreading of the connector 730. It will be appreciated that further sets of ribs could be provided to further increase the holding strength. The ribs 850 may be molded into the neck 646 to be tapered on one side to provide a ramp 856 in a tightening direction, and flat on the opposite side to provide a stop 858 in a loosening direction opposite the tightening direction.

The connector 730 includes one or more snap members 860 projecting upward from the flange 746, and as illustrated a pair of circumferentially spaced snap members 860 located 180 degrees from one another. It will be appreciated that the connector 730 can include a snap member for each set of ribs provided on the neck 646. The snap members 860 may be tapered on one side to provide a ramp 862 in the tightening direction, and flat on the opposite side to provide a stop 864 in the loosening direction.

The ribs 850 in each of the first and second sets 852 and 854 are circumferentially spaced from one another a distance to allow the respective snap members 860 on the connector 730 be received between adjacent ribs 850 during tightening of the connector 730 in the neck 646. The tapered ramp 856 on each rib 850 allows the tapered ramp 862 on the respective snap member 860 to move over the rib 850 during tightening and the stop 858 on each rib 850 can engage the stop 864 on the respective snap member 860 to prevent or reduce the ability of the snap members 860 to move over the ribs 850 in the loosening direction, for example by vibration or action by user, thereby preventing loosening of the connector 730 from the neck 646. An audible indication can be provided each time the snap members 860 ratchet over one of the ribs 850, and the position of the snap members 860 relative to the ribs 850 can provide a visual indicator of degree of locking. The ribs 850 and snap members 860 provide a positive locking feature to ensure proper compression of the seal between the neck 646 and connector 730 and to provide a tamper resistant assembly.

Turning now to FIGS. 36-48, an exemplary embodiment of the tank is shown at 910. The tank 910 is substantially the same as the above-referenced tank 10, and consequently the same reference numerals but indexed by 900 are used to denote structures corresponding to similar structures in the tanks. In addition, the foregoing description of the tank 10 is equally applicable to the tank 910 except as noted below.

The fluid tank 910 includes an upper dome 912, a lower dome 914, and a shell 916 having a first end 918 connected to the upper dome 912 and a second end 920 connected to the lower dome 914. The tank 910 can include a fiberwinding layer 600. The upper dome 912, lower dome 914, and shell 916 form a cavity 922 for receiving a diaphragm. The fluid tank further includes a cap 902 similar to cap 120 that can be connected to an air stem of the fluid tank 910.

The neck 946 of each dome 912, 914 defines a through passage 954 into the cavity 922 and includes a radially inwardly extending annular rib 956 serving as a seat for a seal 924 to ensure a seal is made between the neck 946 and a respective connection 958 to prevent leakage, for example from water and/or air. The neck 946 also includes a radially outwardly extending annular rib 960 along its outer surface configured to capture composite material in a manner that will support the connection attached to the neck 946 and keep the connection in position when under high burst pressures.

The connections 958 are received in the through passage 954 of the respective dome 912, 914 and attached to the respective dome 912, 914 in a suitable manner, such as by insert molding. The connections 958 may be made of a suitable material, such as a polymer, such as a polypropylene copolymer, such as a glass-filled polypropylene. The connections 958 each have a through passage 964 with threads 966 along an inner surface thereof and a flange portion 968 received in a corresponding area in the domes 912 and 914.

The cap 902 can include a leveling portion 904 that can be used to indicate orientation and to ensure that the cap and the tank 910 are level with respect to a ground surface. In an example, the leveling portion 904 can be a spirit level that indicates an angle or orientation of the tank 910. For instance, when an air bubble portion is centered in the leveling portion 904, the tank 910 may be oriented vertically in a level orientation. It should be appreciated that the leveling portion 904 can be configured to use any suitable technology according to sound engineering judgment.

As illustrated in FIGS. 36-41, the connections 958 can include the flange portion 968 that is larger than the flange portion 68 of tank 10. The flange 968 can provide a larger area to which the connection 958 can be affixed to or received in the corresponding areas of domes 912 and 914. The larger flange can increase the strength of the tank 910 and can mitigate failure due to high pressure bursting related to the joining of connection 958 and corresponding domes 912 and 914. The flange 968 can be larger in both length, depth, and width, compared to the flange 68 of tank 10.

The tank 910 further includes an additional seal 925 along with the seal 924. In this implementation, the seal 925 can be referred to as the primary seal and the seal 924 can be referred to as the secondary seal. It should be appreciated that for tank 10, the seal 124 may be the primary seal. In the embodiment illustrated with regard to tank 910, the additional seal 925 can provide increased sealing capabilities and can operate as the primary sealing component while the seal 924 can be the secondary sealing component. The use of a primary seal 925 and a secondary seal 924 may reduce radial forces on the threading 966 or at the neck 946 resulting in a more robust design that is less prone to failure. For instance, the use of the primary seal 925 and the secondary seal 924 can reduce the likelihood of hydromantic bursting caused by failure points near the seals by increasing the total vessel strength proximate the neck 946. Utilizing a backup/secondary seal can increase safety and mitigate leaks. The primary seal 925 and the secondary seal 924 can be any suitable seal such as a radial seal, an O-ring, gasket, or other seal. By way of example, a radial seal such as the primary seal 925 can be more forgiving compared to the secondary seal 924 as it is not dependent on torque as can be true for the secondary seal 924. It should be appreciated that the primary seal 925 can be used with the secondary seal 924 according to sound engineering judgment. Similarly, any number of seals may be used according to sound engineering judgment.

Figure 41:
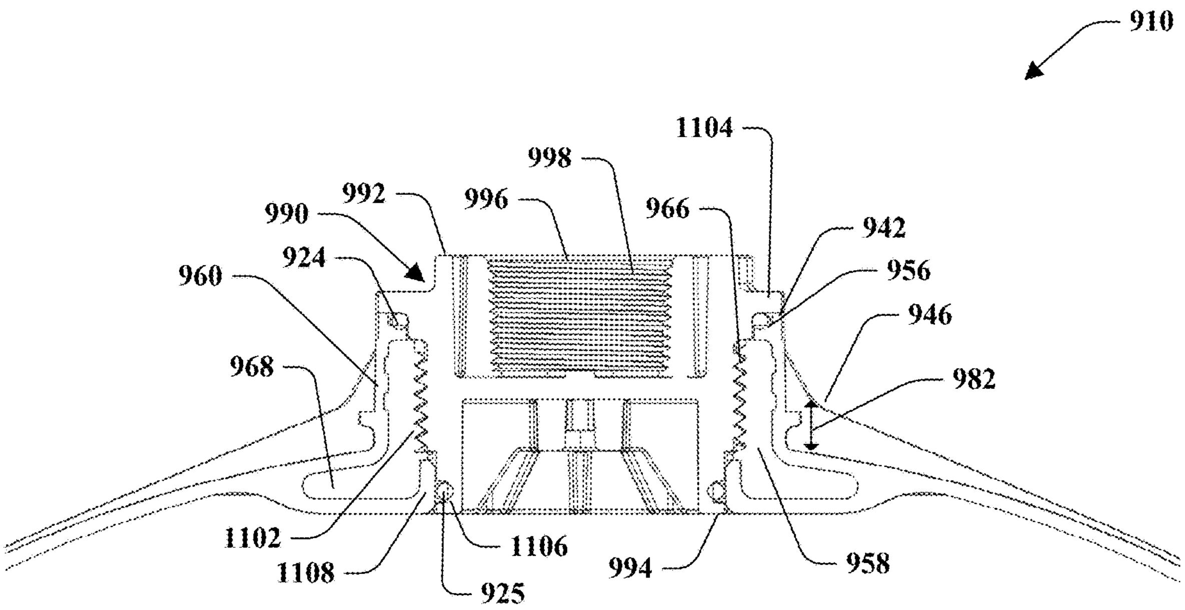
FIG. 41 is a cross-sectional view of an exemplary tank.

Turning to FIG. 41, an exemplary air connector 990 configured to be coupled to the connection of the upper dome 912 is shown. The air connector 990 may be similar to air connection 90 in all aspects except as noted herein. The air connector 990 has first and second ends 992 and 994 and a passage 996 extending therethrough. Threads 998 are provided on the inner wall at the upper portion that may be a suitable thread, such as one and one quarter inch NPT threads. An air stem (not shown) can be received in a passage 996 of the connection 990.

Figure 38:
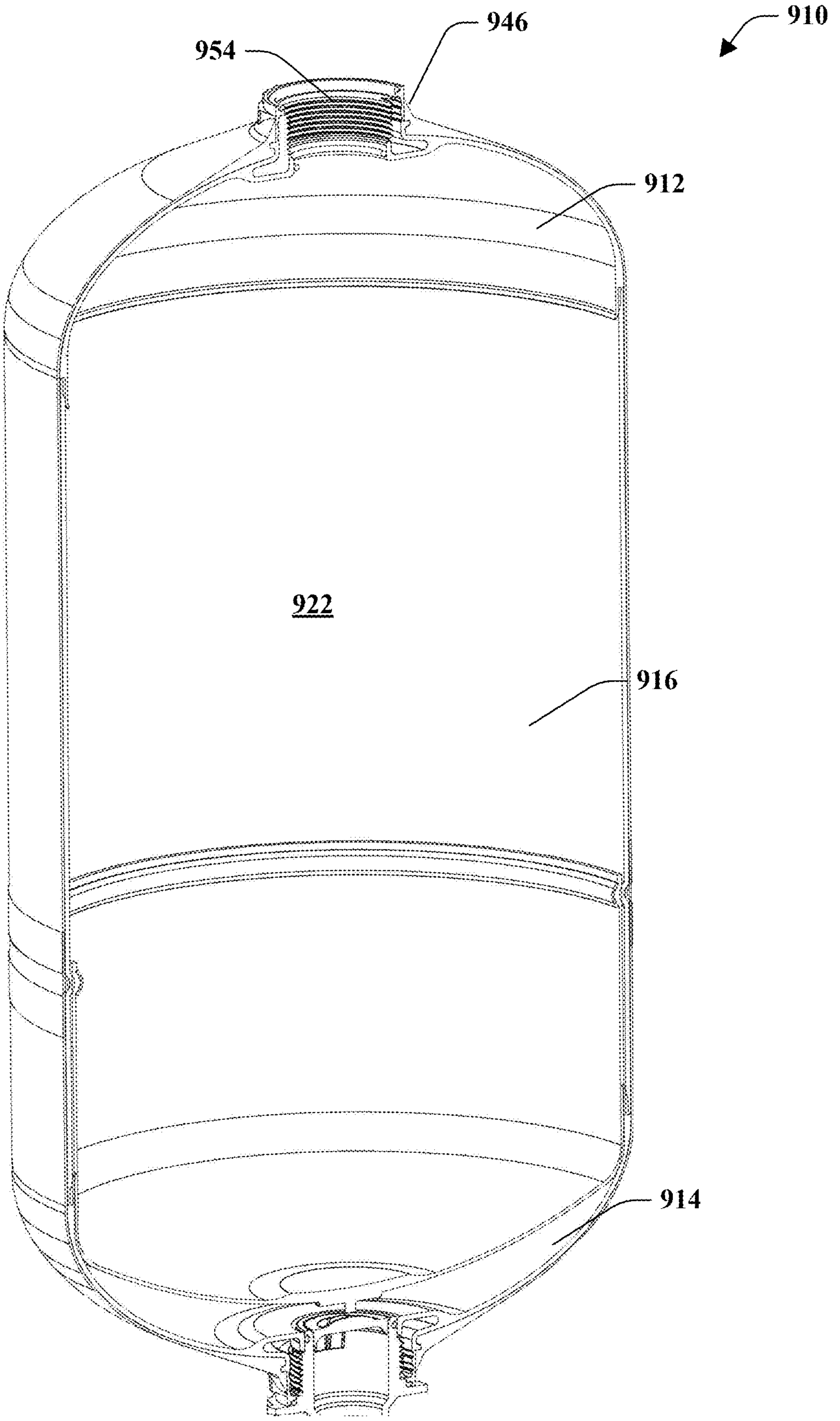
FIG. 38 is a cross-sectional view of the tank from FIG. 37.
Figure 39:
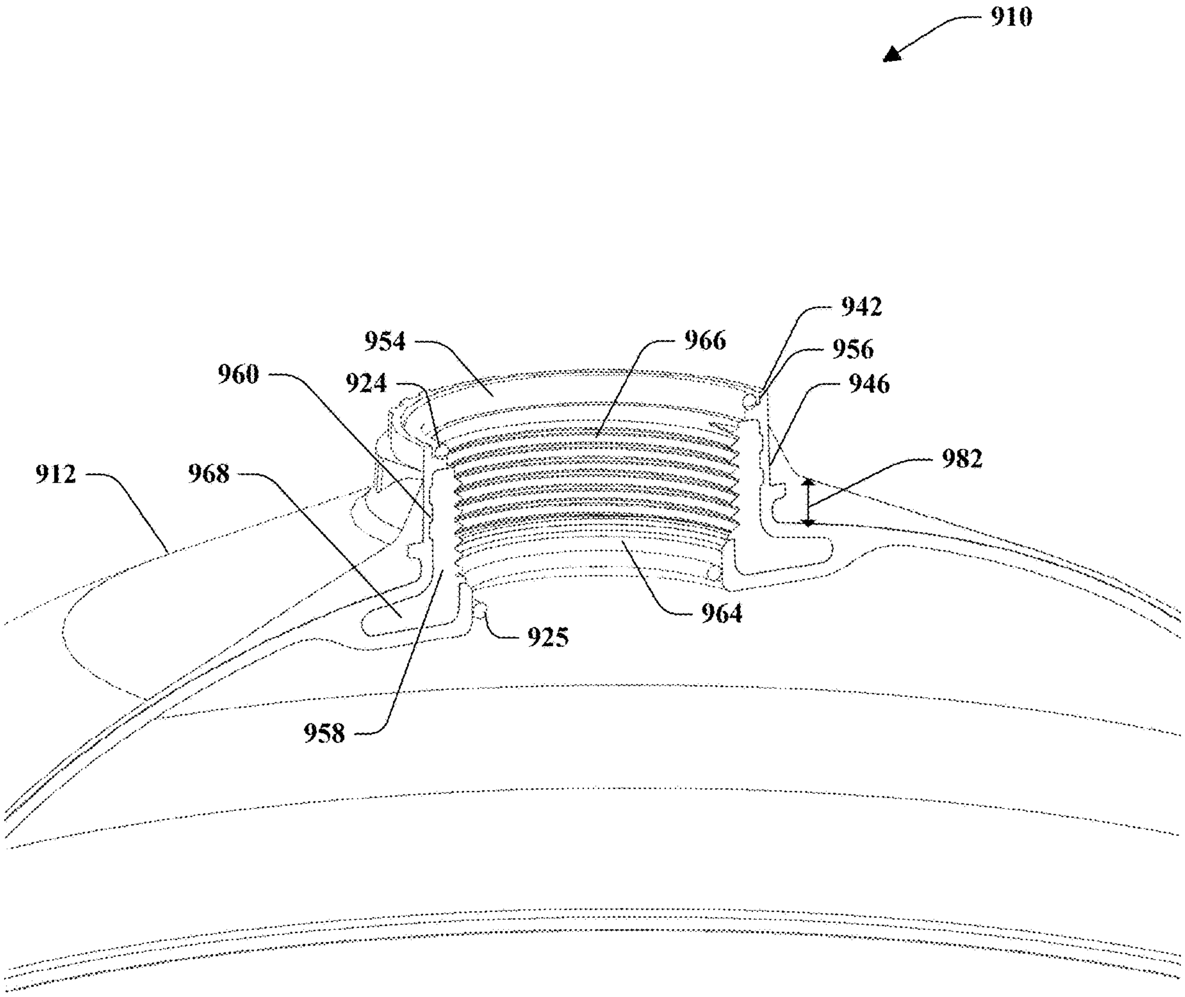
FIG. 39 is a partial cross-sectional view of the tank from FIG. 37.
Figure 40:
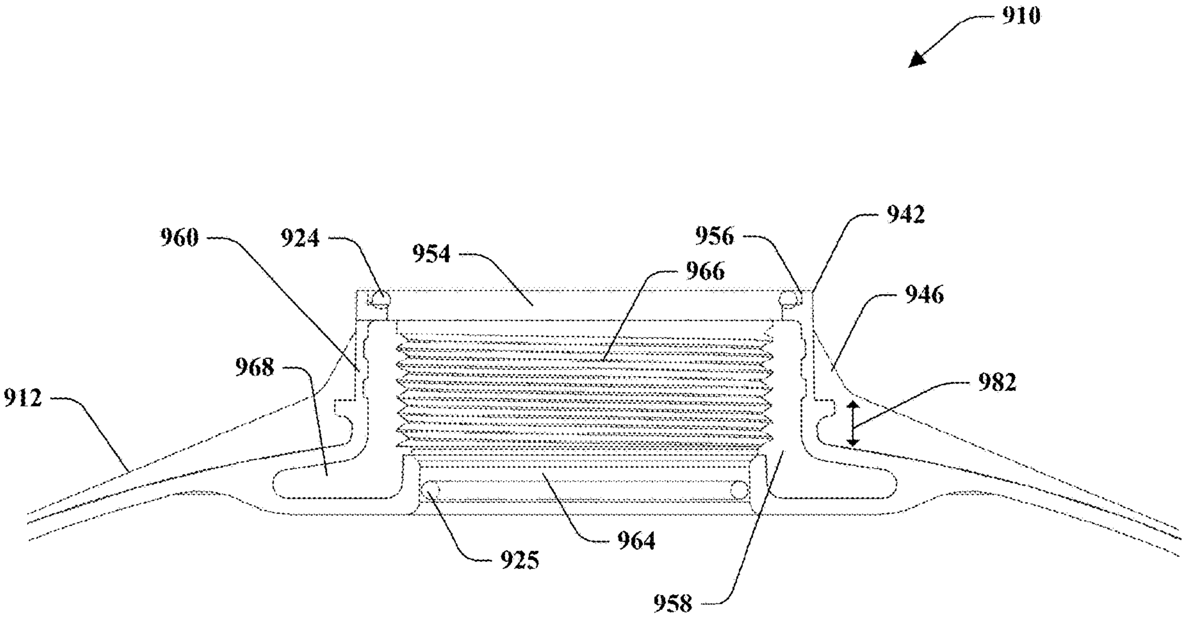
FIG. 40 is a partial cross-sectional view of the tank from FIG. 37.

The air connector 990 also includes threads 1102 along an outer surface for mating with the threads 966 of the connection 958, and a flange 1104 extending outward for abutting the second end 942 of the upper dome 912. The seal 924 is configured to be received in the seat formed by the annular rib 956 and sandwiched between the annular rib 956 and the flange 1104. The seal 925 is configured to be received in a groove 1106 of the air connection 990 such that the seal 925 is sandwiched between a surface of the groove 1106 and a surface 1108 of the upper dome 912. The surface 1108 is a formed by a portion that extends upward to surround the flange portion 968 on both sides, and an end of the surface abuts a radially inwardly extending portion of the connection 958 below the threads. As shown in FIG. 38, the connector similarly includes a flange and groove for receive a pair of seals for sealing to the lower dome.

Figure 42:
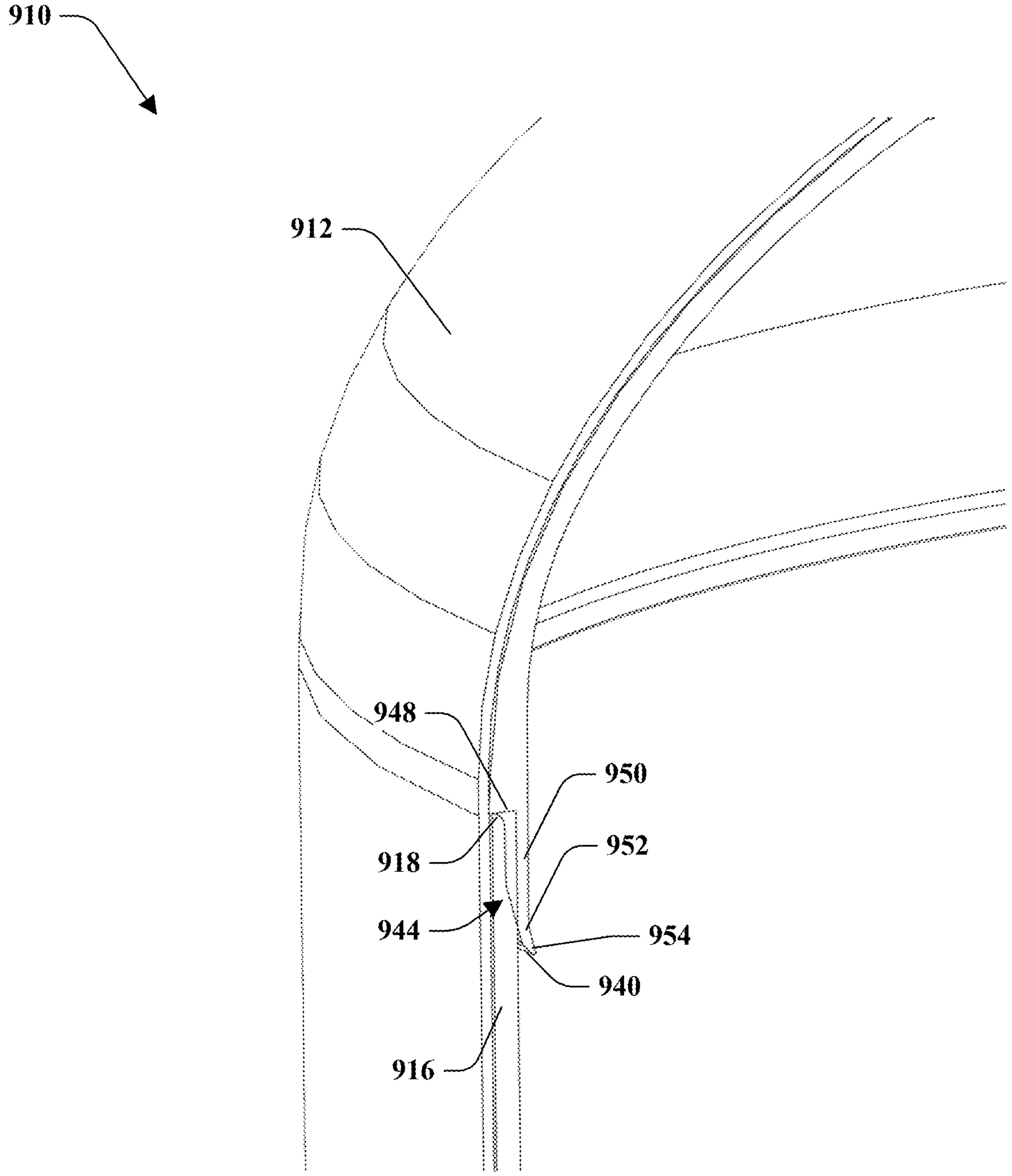
FIG. 42 is a cross-sectional view of a portion of a dome of an exemplary tank.
Figure 43:
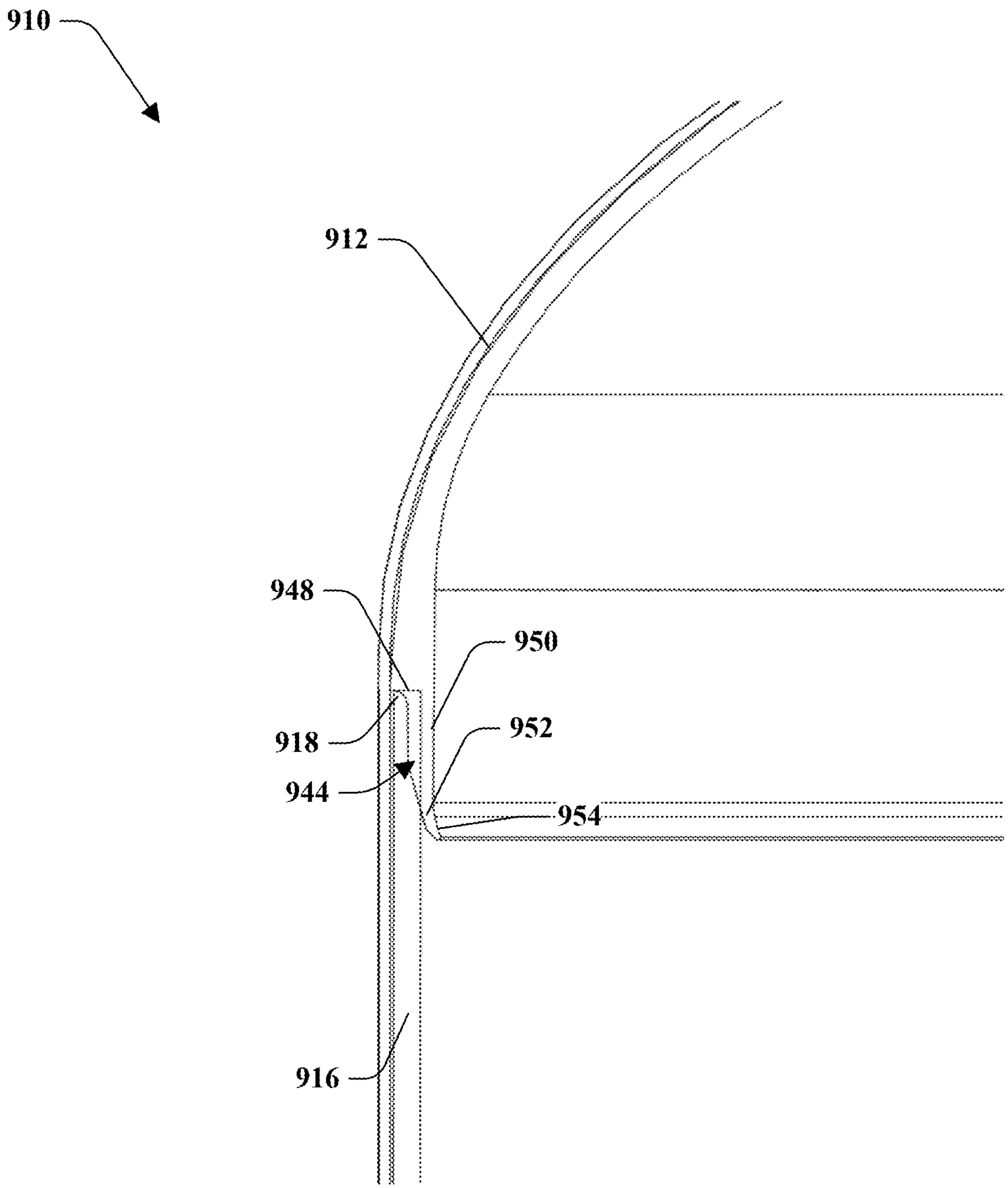
FIG. 43 is a cross-sectional view of a portion of a dome of an exemplary tank.
Figure 44:
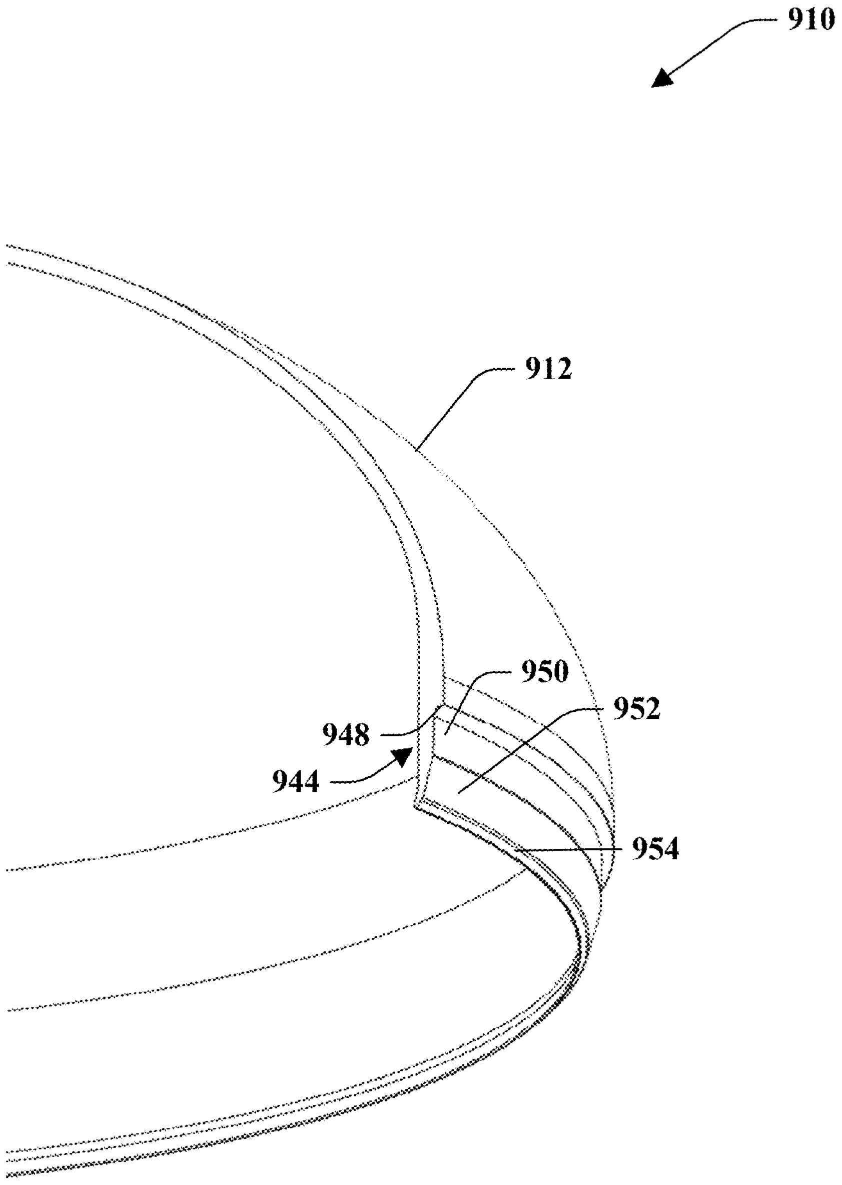
FIG. 44 is a cross-sectional view of a portion of a dome of an exemplary tank.

As illustrated in FIGS. 42-44, each dome 912 and 914 has a lead-in 944 proximate the first end 940 for connection to the respective first or second end 918 or 920 of the shell 916, and a neck 946 at a second end. The lead-ins 944 each include an annular base 948 against which an end face of the first or second ends 918 or 920 abut and first and second portions 950 and 952 that are configured to form a gap between the shell 916 and the second portion 952. A gap may be formed between the shell 916 and the second portion 952 by angling the second portion 952 relative to the first portion 950 such that the second portion 952 is spaced annularly inward from a surface of the shell 916.

Once the domes 912 and 914 and shell 916 are positioned relative to one another, they are connected, for example by spin welding, to form a hermetical seal between one another. The lead-ins 944 allow for ease of assembly and provide a tank where the outer surfaces of the domes 912 and 914 and the shell 916 are substantially flush with one another.

The configuration of the first and the second portions 950 and 952 can ease the assembly process by creating a larger gap between the shell 916 and the second portion 952 such that the dome 912 can be installed onto the shell 916 with larger tolerances between fittings. As the dome 912 is pressed onto the shell 916, and the first end 918 of the shell 912 approaches the annular base 948, the gap between the dome 912 and the shell 916 decreases until the surfaces of the dome 912 and the shell 916 are substantially flush with one another. Said differently, as the dome 912 is pressed onto the shell 916, and the first end 918 of the shell 916 approaches the annular base 948, the gap between the lead-ins 944 and the shell 916 decreases until the surfaces of the lead-ins 944 and the shell 916 are substantially flush with one another. The gap between the dome 912 and the shell 916 decreases because the first portion 950 is spaced closer to the shell 916. Therefore, no gap is formed between the shell 916 and the first portion 950 and the shell 916 are substantially flush with one another. It should be appreciated that the shapes, configuration, tolerances, or distances between the first portion 950 and the second portion 952 can be adjusted and designed according to sound engineering judgment.

The lead-ins 944 can also be provided with a third portion 954 located proximate to the second portion 952. The second portion 952 may be offset at an angle compared to the first portion 950. Similarly, the third portion 954 may be offset at an angle compared to the second portion 952. Therefore, the first, second, and third portions 950, 952, and 954 can be configured to create at least three different gap distances between the dome 912 and the shell 916.

Figure 45:
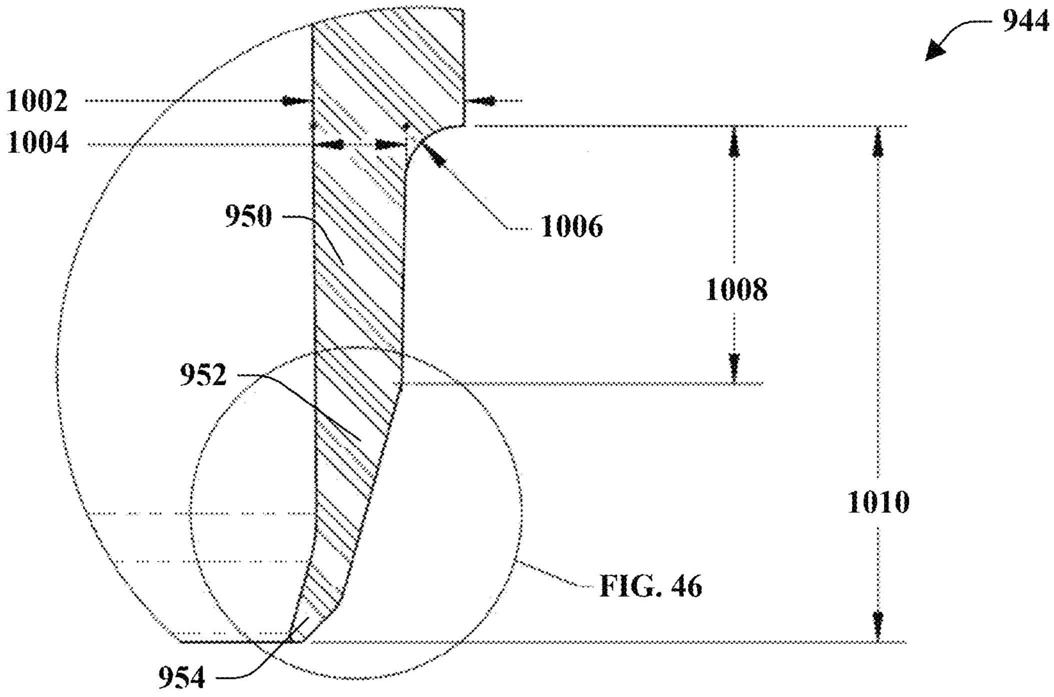
FIG. 45 is a cross-sectional view of a lead-in of a dome of an exemplary tank.
Figure 46:
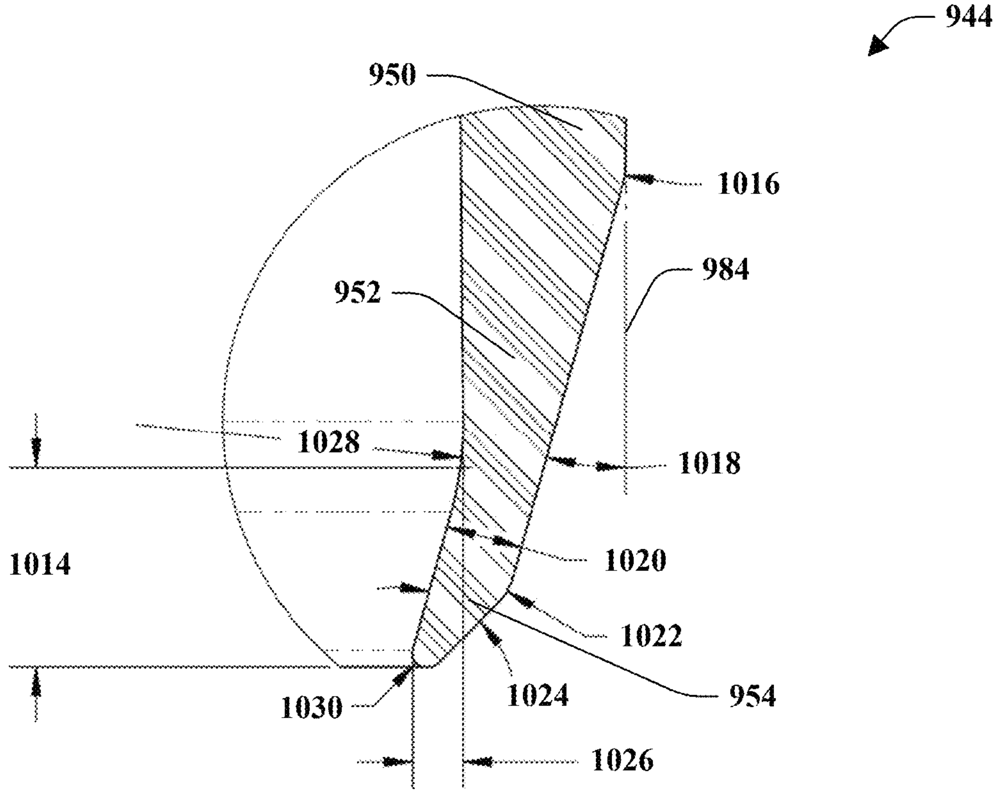
FIG. 46 is an enlarged scale illustration of a portion of the lead-in shown in FIG. 45.

FIGS. 45 and 46 illustrate an exemplary embodiment of the lead-ins 944 in greater detail. For instance, lead-ins 944 can be configured with a thickness 1002, a thickness 1004 less than the thickness 1002, a radius 1006, and distances illustrated as 1008 and 1010. Distance 1008 represents the length of the first portion 950 and distance 1010 represents the length of all of the first, second, and third portions, 950, 952, 954. The first portion 950, the second portion 952, and the third portion 954 can be configured at respective angles compared to the other respective portions. The first portion 950 can be configured at an angle parallel to the normal angle 984. The second portion 952 can be configured at an angle 1018 with respect to normal 984. The third portion 954 can be configured at angle 1024 with respect to normal 984. The angle 1016 represents the radius formed between the first portion 950 and the second portion 952. Additionally, angles 1022 and 1028 can represent the radiuses or curvatures formed at the intersection of the second portion 952 and the third portion 954. The radius 1030 represents the radius of a tip of the third portion 954. The thickness 1020 represents the thickness of a section of the second portion 952. The lead-ins 944 can be further defined with an undercut height 1014 and an undercut width of 1026.

In an embodiment, the thickness 1002 can be within a range of 0.15 to 0.25 units. The thickness 1004 can be within a range of 0.10 to 0.155 units. The radius 1006 can be within a range of to 0.10 units. The distance 1008 can be within a range of 0.35 to 0.40 units. The distance 1010 can be within a range of 0.7 to 0.80 units. The undercut height 1014 can be within a range of 0.10 to units. The radius 1016 can be within a range of 0.04 to 0.06 units. The angle 1018 can be within a range of 10 to 20 degrees. The thickness 1020 can be within a range of 0.55 to 0.65 units. The radius 1022 can be within a range of 0.04 to 0.06 units. The angle 1024 can be within a range of 20 to 40 degrees. The undercut width 1026 can be within a range of 0.03 to 0.05 units. The radius 1028 can be within a range of 0.2 to 0.3 units. The radius 1030 can be within a range of 0.005 to 0.015 units. The units of measure can be any suitable units of measure such as inches, millimeters, centimeters, or the like.

In an embodiment, the first portion 950 can be offset 0 degrees from normal 984. The angle 1018 can be approximately 15 to 20 degrees, and in an example 16 degrees, and the angle 1024 can be approximately 25 to 35 degrees and in an example 30 degrees. In another example the angle 1018 can be a suitable value less than the angle 1024 such that the third portion 954 is angled at a greater angle from normal 984 than the second portion 952. It should be appreciated, however, that dimensions and angles provided are to be construed as non-limiting examples. The specific dimensions and angles of the portions 950, 952, and 954 of the lead-ins 944 can differ according to sound engineering judgment without deviating from the scope of the application.

Figure 47:
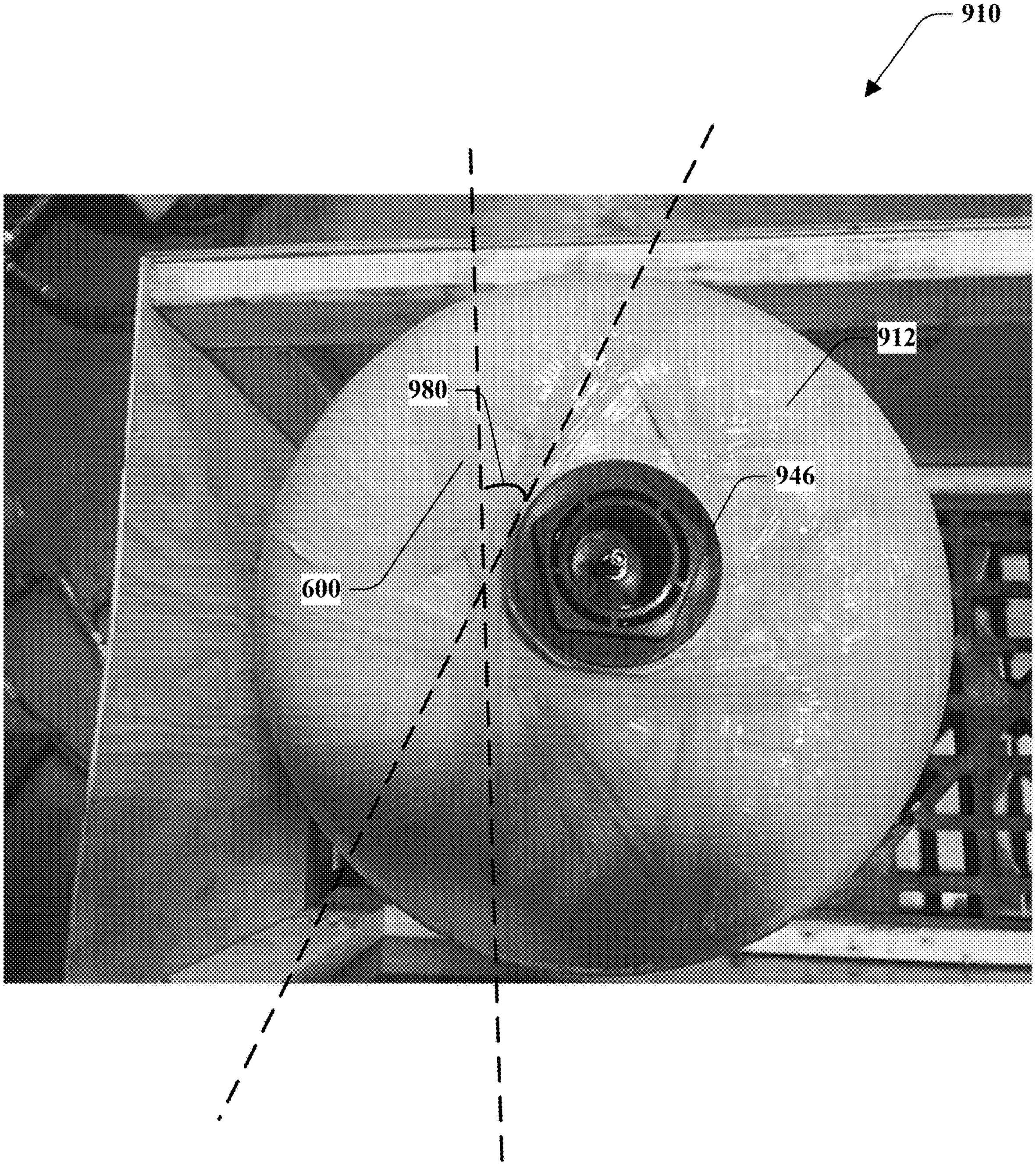
FIG. 47 is a top view of an exemplary tank with fiber windings.
Figure 48:
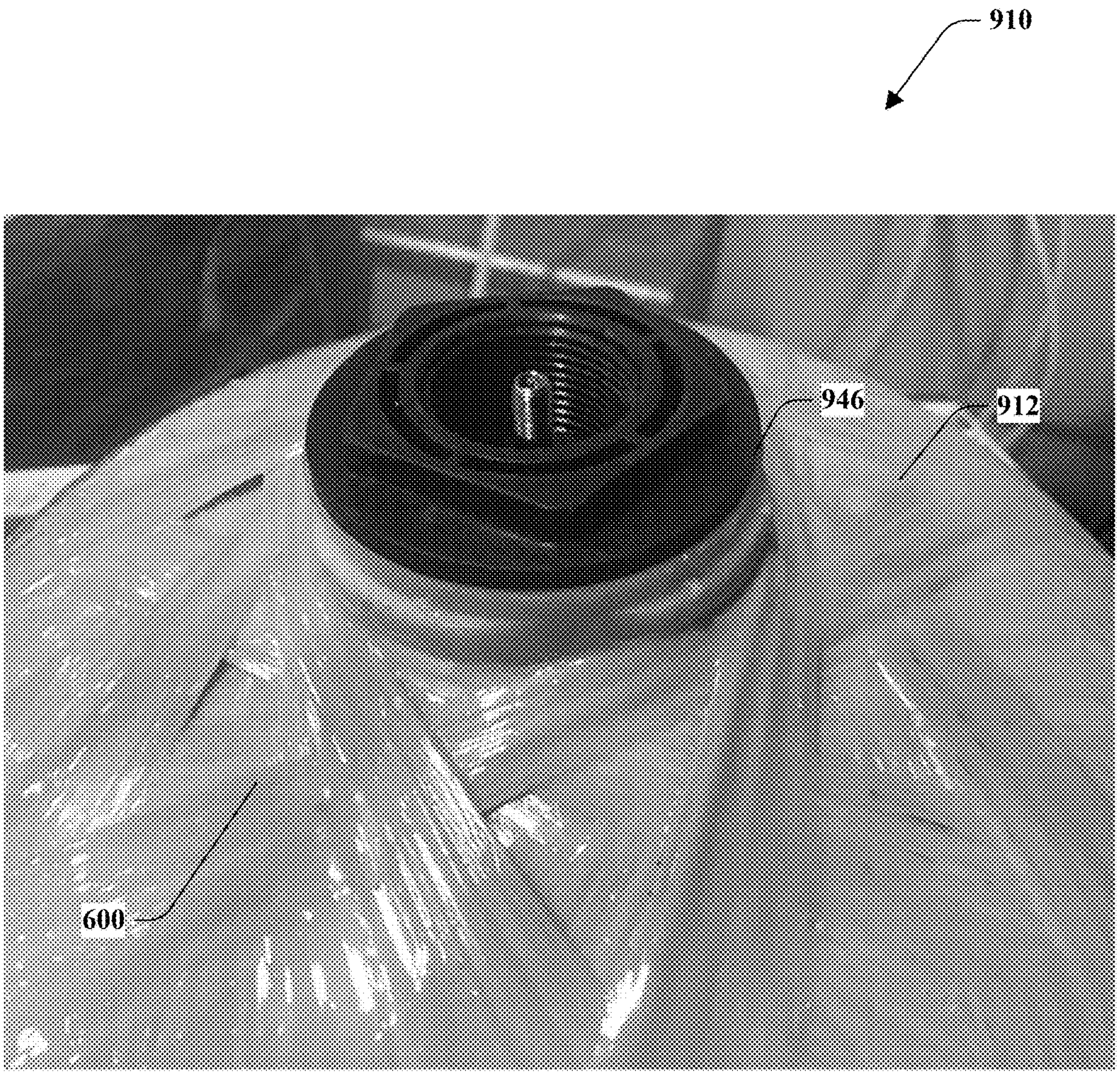
FIG. 48 is a perspective view of an exemplary tank with fiber windings.

As illustrated in FIGS. 47-48, the fiber windings of the tank 910 can be adjusted compared to tank 10. For example, the fiberwinding 600 can include multiple layers of fiberwinding that can be helically and circumferentially wrapped around tanks 10, 310, 410, 510, and 910. In an embodiment, the fiberwinding 600 can be wrapped over a preliminary fiberwinding layer. An outer fiberwinding layer can be formed of the multiple layers of the fiberwinding 600. The fiberwinding 600 can be wrapped about the neck 946 of the tank 910 such that the fiberwindings 600 are deflected at an angle 980 at the neck 946 when wrapped around the tank 910. The angle 980 created by the fiberwindings 600 proximate the neck 946 may improve the structural integrity of the tank 910 proximate the neck 946. In addition to wrapping the fiberwindings 600 at an angle, the fiberwindings 600 can be wrapped such that the thickness 982 (FIGS. 39-41) of the fiberwindings is thicker proximate the neck 946 than other locations of the tank 910. Similarly, the increased thickness 982 of the fiberwindings 600 may improve the structural integrity of the tank 910 proximate the neck 946.

Figure 49:
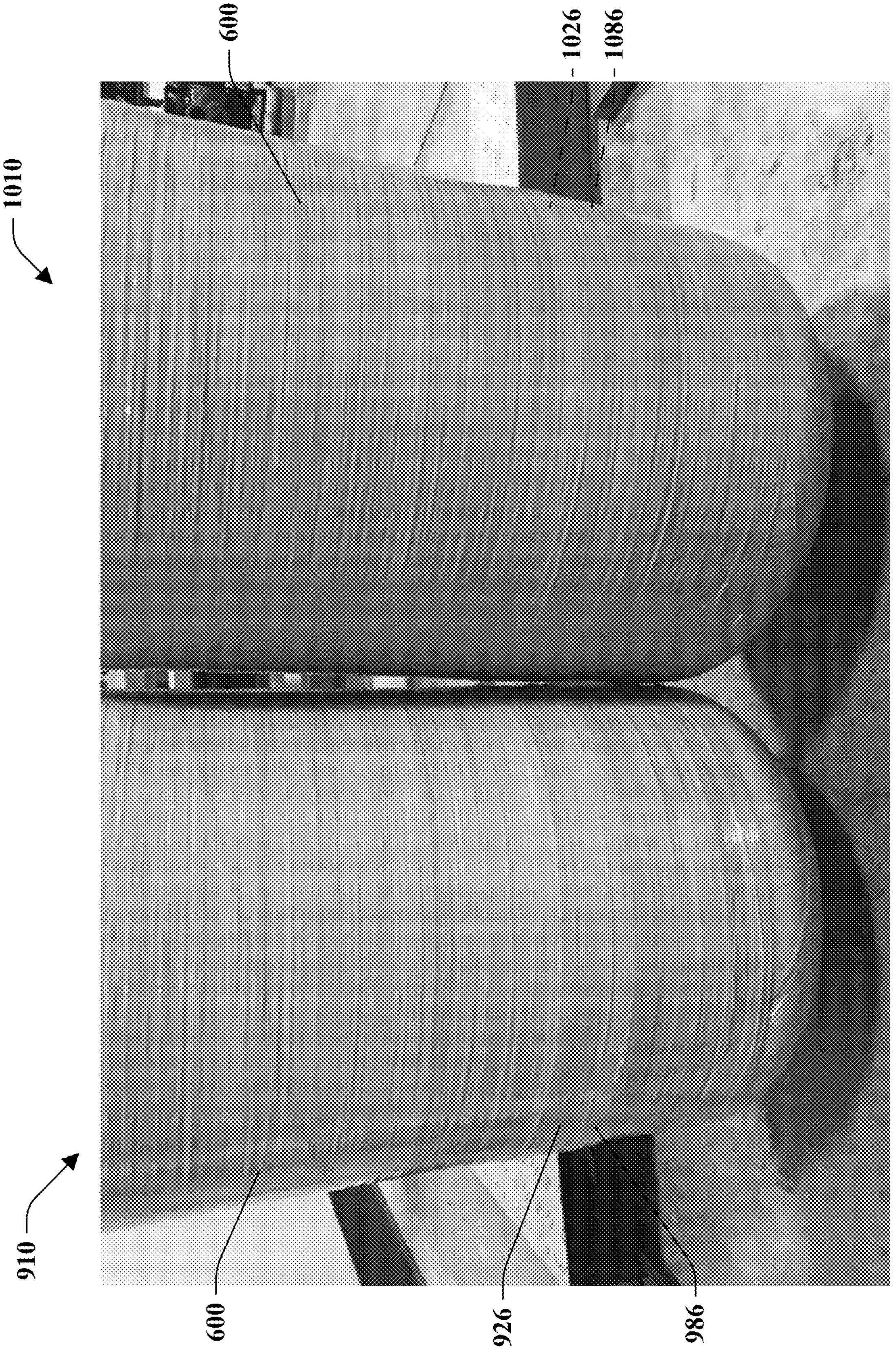
FIG. 49 is a perspective view of an exemplary tank with fiber windings.

Turning to FIG. 49, a tank 1010 can include additional layers of fiberwinding 600 proximate one or more locations of the tank 1010. The tank 1010 is substantially the same as the above-referenced tank 910, and consequently the same reference numerals but indexed by 100 are used to denote structures corresponding to similar structures in the tanks. The foregoing description of the tank 910 is equally applicable to the tank 1010 except as noted below. FIG. 49 illustrates tank 910 and 1010 in a side-by-side configuration so that features of tank 1010 may be more apparent when compared with tank 910.

In the exemplary embodiment illustrated in FIG. 49, the tank 1010 can include one or more additional layers of fiberwinding 600 proximate the band 1026 and the hoop groove 1086. Additional fiberwinding 600 can be utilized to increase the overall thickness of the fiberwinding layer 602 proximate the band 1026 and the hoop groove 1086. It should be appreciated that an increased thickness of the fiberwinding layer 602 can increase the strength of the tank at the location of increased thickness. Therefore, locations that are prone to damage or bursting may be reinforced with additional fiberwinding 600 to increase the strength at the locations to prevent damage or bursting of the tank.

The additional layer of fiberwinding 600 can also increase the overall aesthetics and appearance of the tank 1010. As illustrated in FIG. 49, the band 926 and the hoop groove 986 of the tank 910 may be visible through the fiberwinding 600. The tank 1010, configured with one or more additional layers of fiberwinding 600 may decrease the visibility of the band 1026 and the hoop groove 1086 when viewing the outside of the tank 1010. The additional layer of fiberwinding 600 can also mitigate or reduce abrupt changes in surface elevation of the tank 1010 (e.g., can help to reduce bumps or uneven surfaces of the tank 1010). In other words, both the visual appearance and uneven surface of the tank caused by band 1026 and the hoop groove 1086 can be reduced. To achieve a more uniform appearance, the layers of fiberwinding 600 can be gradually spaced out and tapered to achieve a more desirable visual appearance. For instance, more fiberwinding 600 can be used proximate the band 1026 and the hoop groove 1086 than on the surrounding locations. A gradually decreasing amount of fiberwinding 600 can be used further away from the band 1026 or the hoop groove 1086 (e.g., above or below the tank 1026 or hoop groove 1086) to achieve a smoother and more uniform appearance. As shown in FIG. 49, the surface of the tank 1010 proximate the band 1026 and the hoop groove 1086 can be more uniform than the tank 910 proximate the band 926 and the hoop groove 986.

Although the additional layer of fiberwinding 600 is illustrated proximate the band 1026 and the hoop groove 1086, it should be appreciated the additional layer of fiberwinding 600 can be formed proximate any location of the tank 1010 where additional tank strength may be desired.

The aforementioned systems, components, (e.g., tanks, stands, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A tank comprising:

a polymeric upper dome having a neck with a through passage;

a polymeric lower dome having a neck with a through passage;

a polymeric shell having a first end connected to the upper dome and a second end connected to the lower dome;

a connection attached to each of the upper and lower domes in the through passages of the necks, the connections being the same as one another, each connection having a through passage with threads along an inner surface thereof for connection of attachments;

a connector attached to each of the connections, each connector being sealed to an end of the neck of the respective upper or lower dome by a first seal and being sealed to another area of the neck by a second seal; and wherein the upper dome further comprises a lead-in that engages the first end of the polymeric shell and the lower dome further comprises a lead-in that engages the second end of polymeric shell, each of the lead-ins comprising a first portion, a second portion proximate the first portion, and a third portion proximate the second portion, the first portion oriented parallel to an outer surface of the polymeric shell, the second portion oriented radially inward from the polymeric shell at a first angle compared to the first portion to create a gap between the second portion and the polymeric shell, and the third portion oriented radially inward from the polymeric shell at a second angle compared to the first portion to create a gap between the third portion and the polymeric shell, wherein the second angle is greater than the first angle such that the gap between the third portion and the polymeric shell is greater than the gap between the second portion and the polymeric shell.

2. The tank according to claim 1, wherein the second seal is held in a groove between a surface of the connector and a surface of the neck of the upper dome.

3. The tank according to claim 2, wherein the first seal is dependent on a torque applied to the connector, and the second seal is not dependent on the torque.

4. The tank according to claim 2, wherein the connector attached to the upper dome is a connector having a first end proximate the end of the neck, a second end opposite thereto, and an annular groove proximate the second end for receiving the second seal.

5. The tank according to claim 4, wherein the second seal is a primary sealing component and the first seal is a secondary sealing component.

6. The tank according to claim 1, further including a flexible diaphragm disposed in a cavity formed by the upper dome, lower dome, and shell, the diaphragm being connected to an inner wall of the polymeric shell.

7. The tank according to claim 1, wherein each neck includes a radially inwardly extending annular rib serving as a seat for the first seal that is held between the annular rib of the neck and an outwardly extending flange of the connector and the first seal and the second seal are separated by the threads along the inner surface of the connection.

8. A tank assembly comprising:

a tank including:

a polymeric body defining a cavity and having an upper neck and a lower neck each defining a through passage in communication with the cavity, wherein the polymeric body includes a polymeric upper dome having the upper neck, a polymeric lower dome having the lower neck, and a polymeric shell having a first end connected to the upper dome and a second end connected to the lower dome, an upper connector being sealed to an end of the upper neck by a first seal and being sealed to another area of the upper neck by a second seal;

a lower connector being sealed to an end of the lower neck by a first seal and being sealed to another area of the lower neck by a second seal, the lower connector having an inlet portion attached to the lower neck and a conduit portion extending from the inlet portion, the inlet portion and conduit portion each having a through passage fluidly connected with one another to direct flow from the cavity through the conduit portion; and a support stand supporting the tank, wherein the upper dome further comprises a lead-in that engages the first end of the polymeric shell and the lower dome further comprises a lead-in that engages the second end of polymeric shell, each of the lead-ins comprising a first portion, a second portion proximate the first portion, and a third portion proximate the second portion, the first portion oriented parallel to an outer surface of the polymeric shell, the second portion oriented radially inward from the polymeric shell at a first angle compared to the first portion to create a gap between the second portion and the polymeric shell, and the third portion oriented radially inward from the polymeric shell at a second angle compared to the first portion to create a gap between the third portion and the polymeric shell, wherein the second angle is greater than the first angle such that the gap between the third portion and the polymeric shell is greater than the gap between the second portion and the polymeric shell.

9. The tank assembly according to claim 8, wherein the second seal is a primary sealing component and the first seal is a secondary sealing component.

10. The tank assembly according to claim 8, wherein the second seal is held in a groove between a surface of the respective upper or lower connector and a surface of the respective upper neck or lower neck.

11. The tank according to claim 10, wherein the first seal is dependent on a torque applied to the respective upper or lower connector, and the second seal is not dependent on the torque.

12. The tank assembly according to claim 8, wherein the tank further includes a cap configured to attach to the upper or lower connectors, the cap comprising a leveling ring configured to indicate an orientation of the tank.

13. The tank assembly of claim 8, further comprising:

an upper and lower connection attached to the polymeric body in the through passages of the respective upper and lower neck, each of the upper and lower connections having a through passage with threads along an inner surface thereof, wherein each of the upper neck and the lower neck include a radially inwardly extending annular rib that serves as a seat for the first seal that is held between the annular rib or the respective upper or lower neck and an outwardly extending flange of the respective upper or lower connector and the first seal and the second seal are separated by the threads along the inner surface of the upper and lower connection.

14. A tank comprising:

a polymeric upper dome;

a polymeric lower dome;

a polymeric shell having a first end connected to the upper dome and a second end connected to the lower dome and forming with the upper and lower dome a cavity;

a flexible diaphragm connected to an inner wall of the polymeric shell in the cavity; and a fiberwinding layer around an outer surface of the polymeric upper dome, polymeric lower dome, and polymeric shell, wherein the upper dome further comprises a lead-in that engages the first end of the polymeric shell and the lower dome further comprises a lead-in that engages the second end of polymeric shell, each of the lead-ins comprising a first portion, a second portion proximate the first portion, and a third portion proximate the second portion, the first portion oriented parallel to an outer surface of the polymeric shell, the second portion oriented radially inward from the polymeric shell at a first angle compared to the first portion to create a gap between the second portion and the polymeric shell, and the third portion oriented radially inward from the polymeric shell at a second angle compared to the first portion to create a gap between the third portion and the polymeric shell, wherein the second angle is greater than the first angle such that the gap between the third portion and the polymeric shell is greater than the gap between the second portion and the polymeric shell.

* * * * *